US012142192B2

(12) United States Patent
Shigeta et al.

(10) Patent No.: US 12,142,192 B2
(45) Date of Patent: Nov. 12, 2024

(54) DISPLAY MODULE AND DISPLAY DEVICE

(71) Applicant: SAMSUNG ELECTRONICS CO., LTD., Suwon-si (KR)

(72) Inventors: Tetsuya Shigeta, Suwon-si (KR); Jinho Kim, Suwon-si (KR); Sangyoung Park, Suwon-si (KR); Donggun Oh, Suwon-si (KR); Hoseop Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 17/833,427

(22) Filed: Jun. 6, 2022

(65) Prior Publication Data

US 2022/0301500 A1 Sep. 22, 2022

Related U.S. Application Data

(63) Continuation of application No. PCT/KR2021/001390, filed on Feb. 3, 2021.

(30) Foreign Application Priority Data

Feb. 26, 2020 (KR) ........................ 10-2020-0023724

(51) Int. Cl.
*G09G 3/32* (2016.01)
*G09G 3/20* (2006.01)

(52) U.S. Cl.
CPC ............ *G09G 3/32* (2013.01); *G09G 3/2074* (2013.01); *G09G 2300/0452* (2013.01); *G09G 2320/0633* (2013.01); *G09G 2330/021* (2013.01)

(58) Field of Classification Search
CPC ................... G09G 3/32; G09G 3/2074; G09G 2300/0452; G09G 2320/0633; G09G 2330/021
See application file for complete search history.

(56) References Cited

U.S. PATENT DOCUMENTS 8,111,020 B2 2/2012 Furukawa et al.
9,029,849 B2 5/2015 Kim
(Continued)

FOREIGN PATENT DOCUMENTS

JP 2010272410 A 12/2010
JP 5596898 B2 9/2014
(Continued)

OTHER PUBLICATIONS

International Search Report (PCT/ISA/210) dated May 18, 2021 issued by the International Searching Authority in International Application No. PCT/KR2021/001390.
(Continued)

*Primary Examiner* — Xuemei Zheng
*Assistant Examiner* — Nathan P Brittingham
(74) *Attorney, Agent, or Firm* — Sughrue Mion, PLLC

(57) ABSTRACT

A display module is provided. The display module includes a plurality of sub-pixel circuits, each sub-pixel circuit including: an inorganic light-emitting diode, a transistor connected in parallel with the inorganic light-emitting diode, and a pulse width modulation (PWM) circuit configured to control a light-emitting time of the inorganic light-emitting diode by controlling a voltage of a gate terminal of the transistor based on an applied PWM data voltage that is applied to the PWM circuit; and a pulse amplitude modulation (PAM) circuit which is connected in series with an inorganic light-emitting diode of one of the plurality of sub-pixel circuits, the PAM circuit being configured to provide a driving current having a constant amplitude to the inorganic light-emitting diodes, wherein the inorganic light-emitting diodes of the plurality of sub-pixel circuits are connected in series to each other.

15 Claims, 23 Drawing Sheets

(56) References Cited

U.S. PATENT DOCUMENTS

| | | | | |
|---|---|---|---|---|
| 9,491,838 | B2 | 11/2016 | Frattini et al. | |
| 9,666,128 | B2 | 5/2017 | Jeong | |
| 9,697,766 | B2 | 7/2017 | Kikuchi et al. | |
| 9,870,757 | B2 | 1/2018 | Genoe | |
| 10,157,573 | B2 | 12/2018 | Pappas et al. | |
| 10,916,192 | B2 | 2/2021 | Pappas et al. | |
| 11,727,869 | B2 | 8/2023 | Pappas et al. | |
| 2005/0243029 | A1 * | 11/2005 | Kang | G09G 3/22 345/74.1 |
| 2007/0046485 | A1 * | 3/2007 | Grootes | H05B 45/46 340/815.45 |
| 2010/0103181 | A1 | 4/2010 | Kawabe | |
| 2017/0309224 | A1 | 10/2017 | Pappas et al. | |
| 2018/0301080 | A1 * | 10/2018 | Shigeta | G09G 3/32 |
| 2019/0027094 | A1 | 1/2019 | Pappas et al. | |
| 2021/0134220 | A1 | 5/2021 | Pappas et al. | |
| 2022/0101781 | A1 * | 3/2022 | Baumheinrich | G09G 3/32 |

FOREIGN PATENT DOCUMENTS

| | | | |
|---|---|---|---|
| KR | 1020100027895 | A | 3/2010 |
| KR | 1020130052815 | A | 5/2013 |
| KR | 101469047 | B1 | 12/2014 |
| KR | 1020160074762 | A | 6/2016 |
| KR | 1020180115615 | A | 10/2018 |
| KR | 10-2019-0004717 | A | 1/2019 |
| KR | 102011178 | B1 | 8/2019 |
| KR | 102006702 | B1 | 10/2019 |
| KR | 1020190137658 | A | 12/2019 |
| WO | 2019231074 | A1 | 12/2019 |

OTHER PUBLICATIONS

Written Opinion (PCT/ISA/237) dated May 18, 2021 issued by the International Searching Authority in International Application No. PCT/KR2021/001390.

Communication issued Apr. 22, 2024 by the Korean Intellectual Property Office in Korean Patent Application No. 10-2020-0023724.

* cited by examiner $$P = 4 \times V_{DD} \times I_d$$

$P = V_{DD} X\ I_d$

1410

$$P = I \cdot (V_{ds} + V_f) \cdot n$$
$$= n \cdot I \cdot V_{ds} + n \cdot I \cdot V_f$$

1420

$$P = I \cdot (V_{ds} + n \cdot V_f)$$
$$= I \cdot V_{ds} + n \cdot I \cdot V_f$$

1430

POWER REDUCTION RATE $$\frac{(n-1) \cdot V_{ds}}{n \cdot (V_{ds} + V_f)}$$

| Vds | 10 | 10 | 10 | 10 | 10 | 10 | 10 | 10 | 10 |
|---|---|---|---|---|---|---|---|---|---|
| Vf | 2 | 2 | 2 | 2 | 2 | 2 | 2 | 2 | 2 |
| n | 2 | 3 | 4 | 5 | 6 | 7 | 8 | 9 | 10 |
| REDUCTION RATE | -42% | -56% | -63% | -67% | -69% | -71% | -73% | -74% | -75% |

DISPLAY MODULE AND DISPLAY DEVICE

CROSS-REFERENCE TO RELATED APPLICATIONS

This application is a continuation application of International Application No. PCT/KR2021/001390, filed on Feb. 3, 2021, which claims priority to Korean Patent Application No. 10-2020-0023724, filed on Feb. 26, 2020, in the Korean Intellectual Property Office, the disclosures of which are incorporated by reference herein in their entireties.

BACKGROUND

1. Field

The disclosure relates to a display module and a display apparatus, and more particularly, to an active matrix (AM) display module and a display apparatus.

2. Description of Related Art

In the related art, an inorganic light-emitting diode (LED) display is driven mainly by a passive matrix (PM) driving, but in the case of PM driving, an emission duty ratio is low and is not suitable for low power consumption. Therefore, for low power consumption of an inorganic LED display, an AM driving using a pixel circuit composed of a transistor and/or a capacitor is required.

The AM driving method includes a pulse amplitude modulation (PAM) scheme representing gray scales with the amplitude of a driving current, and a pulse width modulation (PWM) scheme representing gray scales with a driving time (or pulse width) of the driving current.

The inorganic LED has a nature that luminous efficiency increases when the amplitude of the driving current increases. Therefore, in order to enhance the luminous efficiency of the inorganic LED and to improve the luminance of the inorganic LED display, it is necessary to increase the amplitude of the driving current.

However, in the case of increasing the amplitude of the driving current, a power supply circuit with a larger capacity is required to provide an increased instantaneous current, thereby increasing the manufacturing cost of the inorganic LED display, generating a design limitation due to an increase in the area of the substrate, and reducing practicality. In addition, due to the increased instantaneous current, IR-drop and the power supply voltage are increased in the display, thereby generating a problem of increasing power consumption.

SUMMARY

Provided are a display module and a display apparatus that may increase an amplitude of a driving current flowing through each LED for every pixel while maintaining low power consumption of a display.

Further, provided are a display module and a display apparatus that may improve the luminance of a display while maintaining low power consumption of the display.

Further still, provided are a display module and a display apparatus capable of low power driving with respect to the same luminance.

According to an aspect of the disclosure, a display module includes: a plurality of sub-pixel circuits, each sub-pixel circuit including: an inorganic light-emitting diode, a transistor connected in parallel with the inorganic light-emitting diode, and a pulse width modulation (PWM) circuit configured to control a light-emitting time of the inorganic light-emitting diode by controlling a voltage of a gate terminal of the transistor based on an applied PWM data voltage that is applied to the PWM circuit; and a pulse amplitude modulation (PAM) circuit which is connected in series with an inorganic light-emitting diode of one of the plurality of sub-pixel circuits, the PAM circuit being configured to provide a driving current having a constant amplitude to the inorganic light-emitting diodes, wherein the inorganic light-emitting diodes of the plurality of sub-pixel circuits are connected in series to each other.

The plurality of sub-pixel circuits may include: a first plurality of sub-pixel circuits; and a second plurality of sub-pixel circuits, wherein the PAM circuit includes: a first PAM circuit configured to provide the driving current of the constant amplitude to first inorganic light-emitting diodes of the first plurality of sub-pixel circuits; a second PAM circuit configured to provide the driving current of the constant amplitude to second inorganic light-emitting diodes of the second plurality of sub-pixel circuits.

The inorganic light-emitting diodes of the plurality of sub-pixel circuits may be any one of a red (R) light-emitting diode, a green (G) light-emitting diode, and a blue (B) light-emitting diode.

The display module may further include a plurality of scan lines configured to select a plurality of pixels disposed in a matrix form line by line, each of the plurality of pixels including red (R), green (G) and blue (B) sub-pixels, wherein the plurality of sub-pixel circuits are respectively located in scan lines adjacent to each other.

The plurality of sub-pixel circuits may be driven in an order of a scan period in which the applied PWM data voltage is set to the PWM circuit and a light emitting period in which the inorganic light-emitting diode emits light during a time corresponding to the set PWM data voltage.

The plurality of sub-pixel circuits may include: a first sub-pixel circuit including: a first inorganic light-emitting diode, a first transistor connected in parallel with the first inorganic light-emitting diode, and a first PWM circuit configured to control a first light-emitting time of the first inorganic light-emitting diode by controlling a voltage of a first gate terminal of the first transistor based on an applied first PWM data voltage; and a second sub-pixel circuit including: a second inorganic light-emitting diode, a second transistor connected in parallel with the second inorganic light-emitting diode, and a second PWM circuit configured to control a second light-emitting time of the second inorganic light-emitting diode by controlling a voltage of a second gate terminal of the second transistor based on an applied second PWM data voltage, wherein the first PWM data voltage is applied to the first PWM circuit and the second PWM data voltage is applied to the second PWM circuit during the scan period, and wherein, in a light-emitting period, the first inorganic light-emitting diode and the second inorganic light-emitting diode emit light for a time corresponding to the first PWM data voltage and the second PWM data voltage, respectively.

The PAM circuit may be connected to a driving voltage terminal to which a driving voltage for driving the plurality of sub-pixel circuits is provided, a last inorganic light-emitting diode among the inorganic light-emitting diodes which are sequentially connected in series from the PAM circuit may be connected to a ground voltage terminal, and, in a light-emitting period, the driving voltage may be applied to the driving voltage terminal and a ground voltage may be applied to the ground voltage terminal.

In a time period during which the inorganic light-emitting diodes do not emit light during the light emitting period, a same voltage may be applied to the driving voltage terminal and the ground voltage terminal.

The PAM circuit may be further configured to, in a time period during which the inorganic light-emitting diodes do not emit light during the light emitting period, not provide the driving current to the inorganic light-emitting diodes.

The display module may further include: a switching transistor provided between the driving voltage terminal and the inorganic light-emitting diode connected to the PAM circuit, or between the last inorganic light-emitting diode and the ground voltage terminal, wherein, in a time period in which the inorganic light-emitting diodes do not emit light during the light-emitting period, the switching transistor is turned off.

The display module may further include: a NOR gate circuit, wherein each input of the NOR gate circuit is connected to an output of each PWM circuit included in the plurality of sub-pixel circuits and an output of the NOR gate circuit is connected to a gate terminal of the switching transistor.

Each of the transistor connected in parallel with the inorganic light-emitting diode and the switching transistor may be a p-channel metal oxide semiconductor field effect transistor (PMOSFET), and, in the time period in which the inorganic light-emitting diodes do not emit light during the light-emitting period, output of the each PWM circuit is low, and output of the NOR gate circuit is high, causing the switching transistor to be turned off.

In the time period in which the inorganic light-emitting diodes do not emit light during the light-emitting period, a control signal to turn off the switching transistor may be applied from an external timing controller.

According to an aspect of the disclosure, a display apparatus includes: a display module; and a driving circuit configured to drive the display module, wherein the display module includes: a plurality of sub-pixel circuits, each sub-pixel circuit including: an inorganic light-emitting diode, a transistor connected in parallel with the inorganic light-emitting diode, and a pulse width modulation (PWM) circuit configured to control a light-emitting time of the inorganic light-emitting diode by controlling a voltage of a gate terminal of the transistor based on an applied PWM data voltage that is applied to the PWM circuit; and a pulse amplitude modulation (PAM) circuit which is connected in series with an inorganic light-emitting diode of one of the plurality of sub-pixel circuits, the PAM being configured to provide a driving current of a constant amplitude to the inorganic light-emitting diodes, wherein the driving circuit is further configured to apply a corresponding PWM data voltage to PWM circuits of the plurality of sub-pixel circuits, and wherein the inorganic light-emitting diodes are connected in series to each other.

The PAM circuit may be connected to a driving voltage terminal to which a driving voltage for driving the plurality of sub-pixel circuits is provided, a last light-emitting diode among the inorganic light-emitting diodes sequentially connected in series from the PAM circuit may be connected to a ground voltage terminal, and the display module may further include a switching transistor disposed between the driving voltage terminal and the inorganic light-emitting diode connected to the PAM circuit, or between a last inorganic light-emitting diode and the ground voltage terminal.

As described above, according to one or more embodiments of the disclosure, as the overall instantaneous current of the display decreases, the amplitude of the drive current flowing through each LED of the pixel may be increased while maintaining low power consumption.

Further, according to one or more embodiments of the disclosure, it is also possible to improve the luminance of the display while maintaining low power.

Further still, according to one or more embodiments of the disclosure, a circuit may be simplified, and the designed substrate may be efficiently used, thereby improving the design freedom of the display.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In describing embodiments of the disclosure, detailed descriptions of related art techniques are omitted when it is determined that the disclosure may unnecessarily obscure the gist of the disclosure. In addition, repeated description of the same configuration of the disclosure will be omitted.

The suffix "part" for a component used in the description of the disclosure is added or used in consideration of the convenience of the specification, and it is not intended to have a meaning or role that is distinct from each other.

The terminology used in this disclosure is used to describe an embodiment, and is not intended to restrict and/or limit the disclosure. A singular expression includes plural expressions unless the context clearly indicates otherwise.

In the disclosure, the term "has," "may have," "includes" or "may include" indicates existence of a corresponding feature (e.g., a numerical value, a function, an operation, or a constituent element such as a component), but does not exclude existence of an additional feature.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

The terms used in embodiments of the disclosure may be interpreted in a meaning commonly known to those of ordinary skill in the art unless otherwise defined.

Various embodiments of the disclosure are described in detail with reference to the accompanying drawings.

Figure 1A:
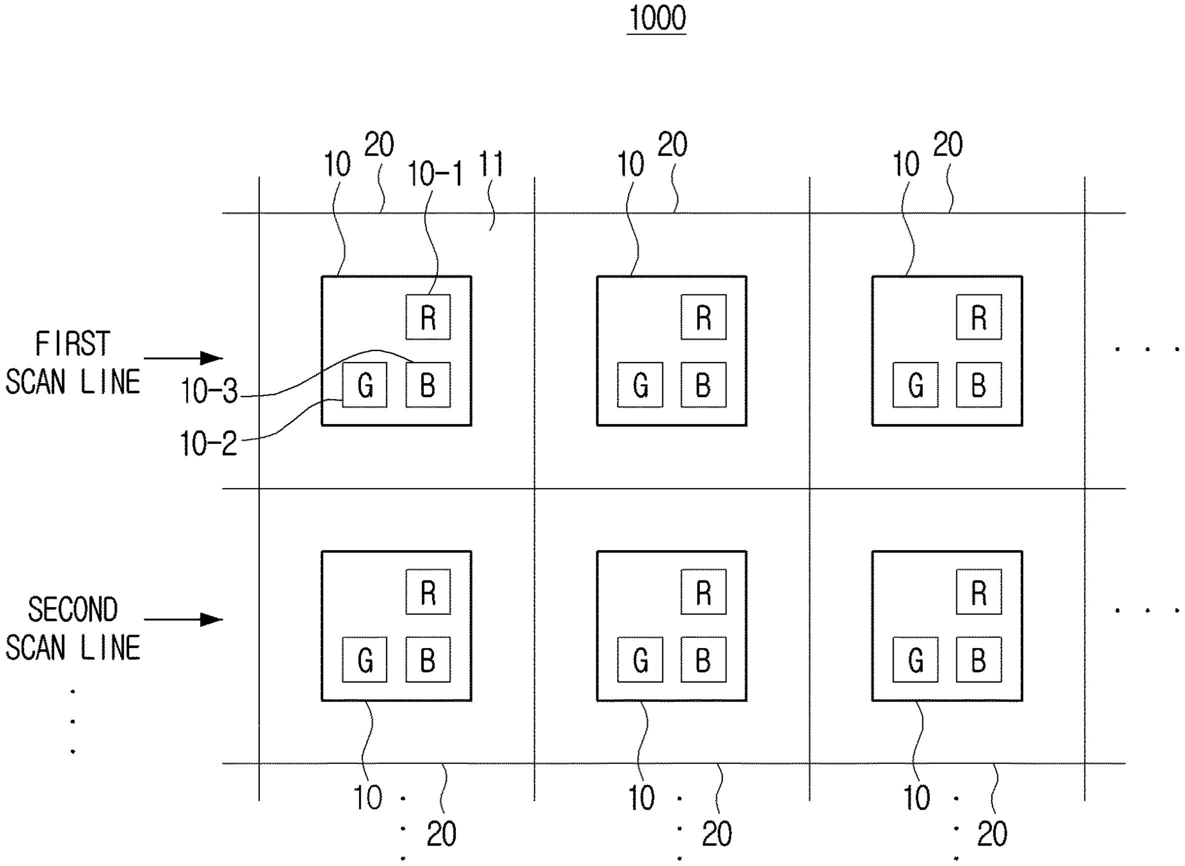
FIG. 1A is a diagram illustrating a pixel structure of a display module, according to an embodiment of the disclosure.

FIG. 1A is a diagram illustrating a pixel structure of a display module according to an embodiment of the disclosure. As illustrated in FIG. 1A, a display module 1000 may include a plurality of pixels 10 disposed or arranged in a matrix format.

Each pixel 10 may include a plurality of sub-pixels 10-1 to 10-3. For example, one pixel 10 included in the display module 1000 may include three types of sub-pixels, such as red (R) sub-pixels 10-1, green (G) sub-pixels 10-2, and blue (B) sub-pixels 10-3. That is, one set of R, G, and B sub-pixels may constitute one unit pixel of the display panel 100.

Referring to FIG. 1A, in the display module 1000, one pixel region 20 includes a region occupied by the pixel 10 and a remaining area 11.

The area occupied by the pixel 10 may include R, G, and B sub-pixels 10-1 to 10-3. Each of the R, G, and B sub-pixels 10-1, 10-2, and 10-3 may include a sub-pixel circuit including an inorganic light-emitting diode of a color corresponding to each sub-pixel, a transistor connected in parallel with the inorganic light-emitting diode, and a pulse width modulation (PWM) circuit for driving the inorganic light-emitting diode.

As described below, the display module 1000 may include a corresponding pulse amplitude modulation (PAM) circuit for every predetermined number of sub-pixel circuits (e.g., N sub-pixel circuits, where N is an integer greater than 1).

According to an embodiment, various circuits for driving sub-pixel circuits included in the display module 1000 may be included in the remaining area 11 around the area occupied by the pixel 10. This embodiment is described in more detail with reference to FIG. 18.

Figure 1B:
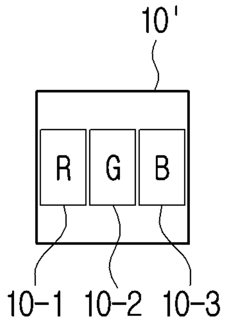
FIG. 1B illustrates a structure of a sub-pixel in one pixel, according to another embodiment of the disclosure.

FIG. 1B illustrates a structure of a sub-pixel in one pixel according to another embodiment of the disclosure. Referring to FIG. 1A, the sub-pixels 10-1 to 10-3 are arranged in an L-shape in which left and right of the sub-pixels 10-1 to 10-3 are changed in one-pixel 10 region.

The embodiment is not limited thereto and, as shown in FIG. 1B, the R, G, and B sub-pixels 10-1 to 10-3 may be arranged in a row inside a pixel 10'. However, the arrangement of the sub-pixels is only one example, and the plurality of sub-pixels may be arranged in various forms according to embodiments within each pixel.

In the example above, a three-type sub-pixel may form one pixel as an example. However, according to an embodiment, four kinds of sub-pixels such as R, G, B, and white (W) may form one pixel. Alternatively or additionally, another number (e.g., integer greater than 1 and not equal to 4) of sub-pixels may form one pixel. For convenience, a case where the pixel 10 includes three types of sub-pixels such as R, G, and B is described.

Figure 2:
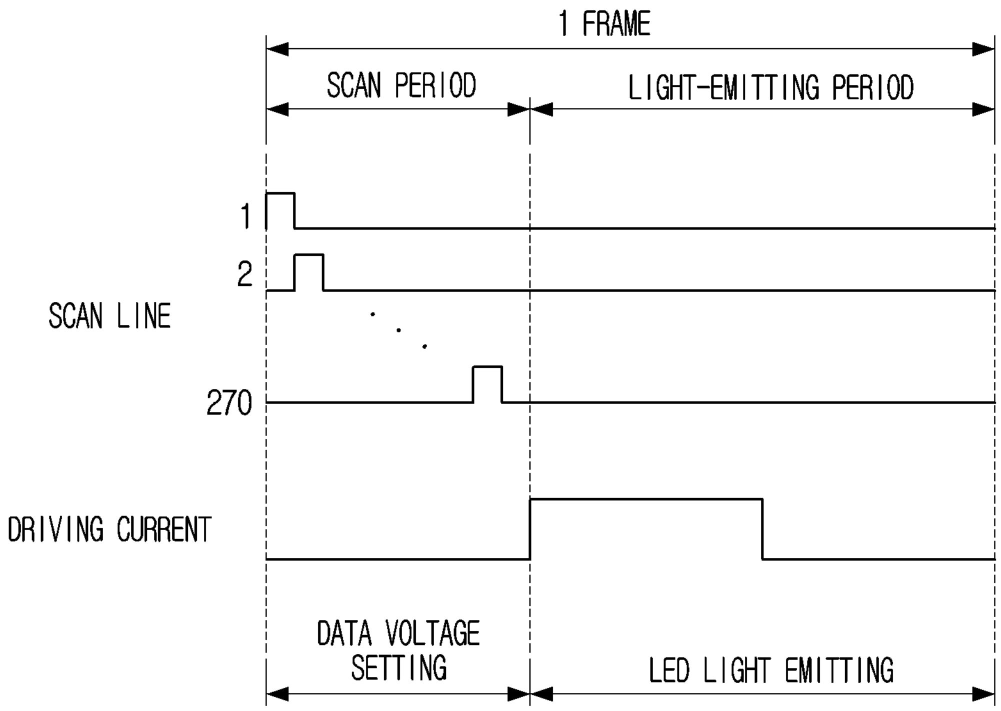
FIG. 2 illustrates a method of driving a display module, according to an embodiment of the disclosure.

FIG. 2 illustrates a method of driving a display module according to an embodiment of the disclosure. Specifically, FIG. 2 illustrates the order in which the display module 1000 is driven during one image frame time.

As shown in FIG. 1A, pixels arranged in a matrix form may constitute a plurality of scan lines in the display module 1000. According to an embodiment of the disclosure, the display module 1000 may be driven in the order of a scan period and a period of light emission as shown in FIG. 2.

The scan period is a period for setting or programming data voltage to the pixels included in the selected scan line and according to an embodiment of the disclosure, the entire pixels included in the display module 1000 may be sequentially selected for each scan line within a scan period.

The light emitting period is a period in which the inorganic light-emitting diode emits light according to the data voltage set in the scan period. According to an embodiment of the disclosure, the pixels included in the entire scan line of the display module 1000 emit light within a light emitting period for a time corresponding to a PWM data voltage set in the scan period.

Figure 3:
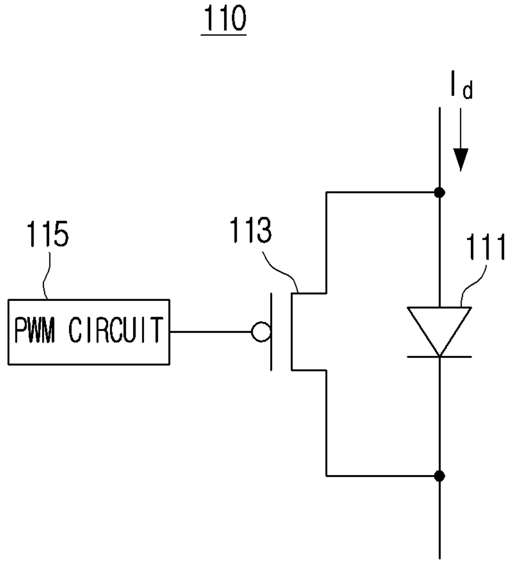
FIG. 3 illustrates a sub-pixel circuit, according to an embodiment of the disclosure.

FIG. 3 illustrates a sub-pixel circuit according to an embodiment of the disclosure. Referring to FIG. 3, the sub-pixel circuit 110 includes an inorganic light-emitting diode 111, a transistor 113, and a PWM circuit 115.

The inorganic light-emitting diode 111 may constitute the sub-pixels 10-1 to 10-3 of the display panel 1000, and there may be a plurality of types depending on the color of the emitted light. For example, the inorganic light-emitting diode 111 may include an R inorganic light-emitting diode emitting red color light, a G inorganic light-emitting diode emitting a green color light, and a B inorganic light-emitting diode emitting blue light.

The types of sub-pixels described above may be determined according to the type of the inorganic light-emitting diode 111. The R inorganic light-emitting diode may constitute the R sub-pixels 10-1, G inorganic light-emitting diode may constitute the G sub-pixel 10-2, and the B inorganic light-emitting diode may constitute the B sub-pixel 10-3.

The inorganic light-emitting diode 111 may refer to a light-emitting diode that is manufactured using an inorganic material which is different from organic light-emitting diode (OLED) manufactured using an organic material.

According to an embodiment, the inorganic light-emitting diode 111 may be a micro light-emitting diode (micro LED or μLED) having a size that is less than or equal to 100 micrometers (μm).

The display panel in which each sub-pixel is implemented with the micro LED is called a micro LED display panel. The micro LED display panel is one of a flat display panel and may include a plurality of inorganic light-emitting diodes, each of which is less than or equal to 100 micrometers. The micro LED display panel may provide better contrast, response time, and energy efficiency compared to a liquid crystal display (LCD) panel requiring backlight. The OLED and the micro LED have good energy efficiency, but the micro LED may provide better performance than the OLED in terms of luminance, light emission efficiency, and operating life.

The transistor 113 may be connected in parallel with the inorganic light-emitting diode 111 to control the flow of the driving current $I_d$. Specifically, the transistor 113 may be turned on or off according to the output signal of the PWM circuit 115 so that the $I_d$ may bypass or flow over the inorganic light-emitting diode 111.

FIG. 3 illustrates a case where the transistor 113 is a P-channel metal oxide semiconductor field effect transistor (PMOSFET). Referring to FIG. 3, the gate terminal of the PMOSFET 113 is connected to the output terminal of the PWM circuit 115, and the source and drain terminals are connected to the anode and cathode terminals of the inorganic light-emitting diode 111.

In this example, if the output of the PWM circuit 115 is high, the transistor 113 is turned off, and the driving current $I_d$ flows through the inorganic light-emitting diode 111. If the output of the PWM circuit 115 is low, the transistor 113 is turned on, and the driving current $I_d$ bypasses the inorganic light-emitting diode 111.

The inorganic light-emitting diode 111 may emit light as the driving current $I_d$ flows only in a time during which the transistor 113 is turned off.

The PWM circuit 115 PWM-controls the inorganic light-emitting diode 111. The PWM driving method controls the light emission time of the inorganic light-emitting diode 111 to represent gray levels.

Specifically, in the example of FIG. 3, the PWM circuit 115 sets a PWM data voltage applied from an external data driver during a scan period. The PWM circuit 115 may apply a high voltage to the gate terminal of the transistor 113 for a time corresponding to the set PWM data voltage within the light emitting period.

Since the transistor 113 is turned off while the high voltage is applied to the gate terminal, the driving current $I_d$ flows through the inorganic light-emitting diode 111 for a time corresponding to the set PWM data voltage, and accordingly, the inorganic light-emitting diode 111 emits light for a time corresponding to the set PWM data voltage within the light emitting period.

As described above, when the inorganic light-emitting diode 111 is driven by the PWM scheme, even though the amplitude of the driving current $I_d$ is the same, the time during which the driving current $I_d$ flows over the light-emitting diode 111 may vary to represent various gray levels. Therefore, a problem that, when the inorganic light-emitting diode is driven by only the PAM method, the wavelength of the light emitted by the inorganic light-emitting diode (especially the micro LED) may be changed according to the gray level may be solved.

Referring to FIG. 3, the transistor 113 is the PMOSFET, but the embodiment is not limited thereto.

For example, transistor 113 may be an N-channel metal oxide semiconductor field effect transistor (NMOSFET). In this example, since the NMOSFET is turned off when the gate terminal voltage is low, and is turned on when the gate terminal voltage is high, the PWM circuit 115 may allow the inorganic light-emitting diode 111 to emit light for a time corresponding to the PWM data voltage by applying a low voltage to the gate terminal of the transistor 113 for a time corresponding to the PWM data voltage within the light emitting period.

According to an embodiment, the transistor 113 may also be a bipolar junction transistor (BJT). In this case, the base terminal of the transistor 113 may be connected to the output terminal of the PWM circuit 115, and the emitter and the collector terminal may be connected to the anode and cathode terminals of the inorganic light-emitting diode 111, respectively, so that the same operation may be performed in the same manner as the case where the transistor 113 is the MOSFET.

Figure 4:
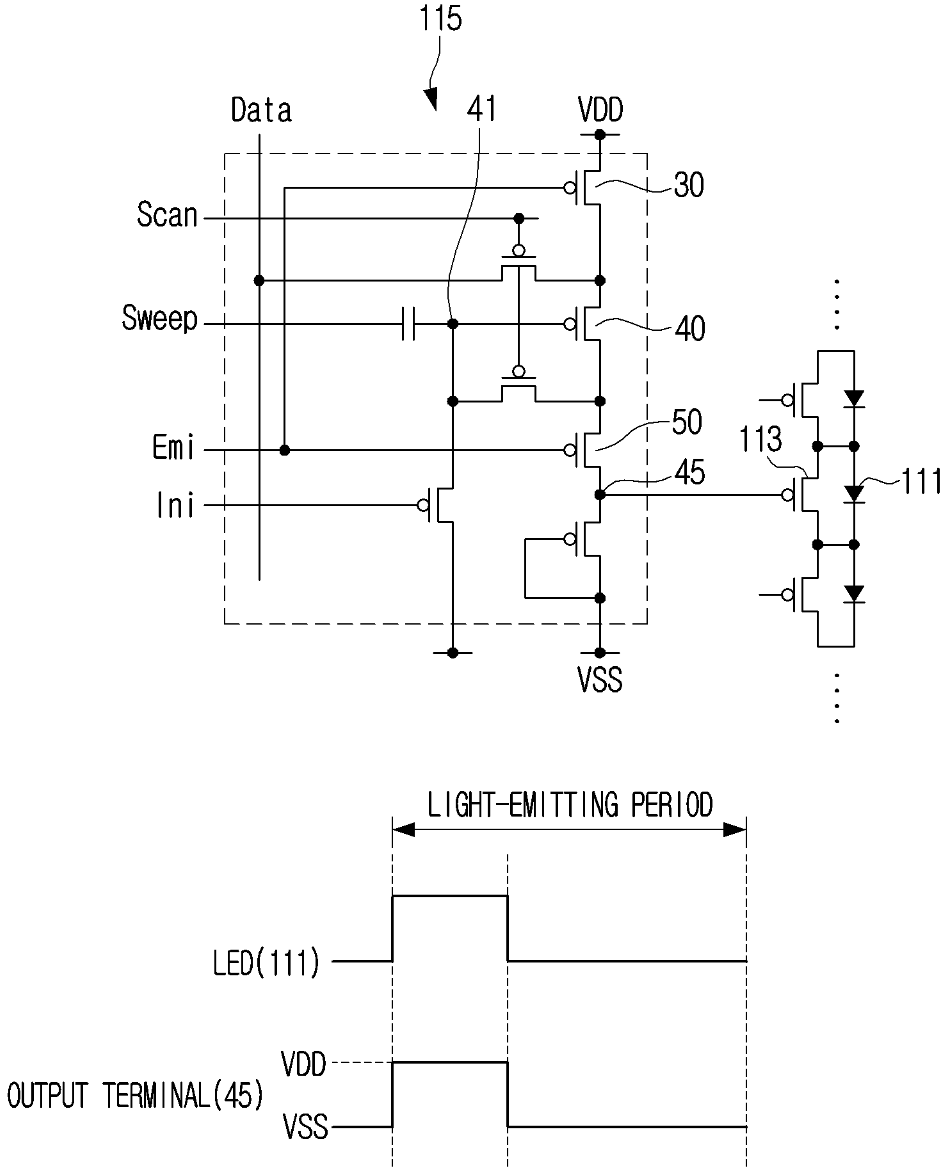
FIG. 4 is a circuit diagram of a PWM circuit, according to an embodiment of the disclosure.

FIG. 4 is a circuit diagram of a PWM circuit according to an embodiment of the disclosure. The upper drawing of FIG. 4 shows an example diagram of the PWM circuit 115, and the lower drawing shows the change of the voltage of the output terminal 45 of the PWM circuit 115 and the emission time of the inorganic light-emitting diode 111 during the light emission period.

Referring to FIG. 4, the PWM circuit 115 controls the on/off operation of the transistor 113 by controlling the voltage of the output terminal 45 connected to the gate terminal of the transistor 113 through the operation of the driving transistor 40 turned on/off based on various control signals and data signals applied thereto. Accordingly, the PWM circuit 115 may control the light emission time of the inorganic light-emitting diode 111.

Specifically, the PWM circuit 115 may set (or program) the applied PWM data voltage to the gate terminal 41 of the driving transistor 40 when the PWM data voltage corresponding to the specific gray is applied through the data line during the scan period.

The PWM data voltage set to the gate terminal 41 of the driving transistor 40 is lower than the voltage corresponding to the sum of the driving voltage VDD and the threshold voltage Vth (having a negative value) of the driving transistor 40, and accordingly, the driving transistor 40 is turned on.

When the emission period starts, the driving voltage VDD is applied to the output terminal 45 through the transistor 30 turned on according to the control signal Emi, the driving transistor 40 in an on state, and the transistor 50 turned on according to the control signal Emi, and is applied to the gate terminal of the transistor 113, the transistor 1130 is turned off, and the inorganic light-emitting diode 111 starts to emit light.

When the light emission period starts, a linearly increasing sweep signal is applied to the PWM circuit 115, and accordingly, the voltage of the gate terminal 41 of the driving transistor 40 also increases. When the increasing voltage of the gate terminal 41 of the driving transistor 40 reaches a voltage corresponding to the sum of the driving voltage VDD and the threshold voltage Vth of the driving transistor 41, the driving transistor 41 is turned off. When the driving transistor 41 is turned off, the driving voltage VDD is no longer applied to the output terminal 45, and the ground voltage VSS is applied to the output terminal 45.

According to the example described above, the time for the voltage of the gate terminal 41 to reach a voltage corresponding to the sum of the driving voltage VDD and the threshold voltage Vth of the driving transistor 41 may get longer as the PWM data voltage is lower, and the time may get shorter as the PWM data voltage is higher. In this way, PWM driving of the inorganic light-emitting diode 111 is possible.

The PWM circuit 115 is not limited to the configuration shown in FIG. 4. If the PWM data voltage is set during the scan period, and the signal for turning off the transistor 113 for a time corresponding to the set PWM data voltage within the light emitting period may be output to the gate terminal of the transistor 113, a nearly infinite number of configurations of the PWM circuit 115 may be implemented, according to an embodiment of the disclosure.

In the example of FIG. 4, a sweep signal is a signal in a linearly increasing format, but according to the configuration or driving method of the PWM circuit 115, a sweep signal of various types such as linearly decreasing or triangulation forms may be used. The sweep signal may be applied to the PWM circuits 115 included in the display module 1000 in a similar manner during the emission period.

Figure 5:
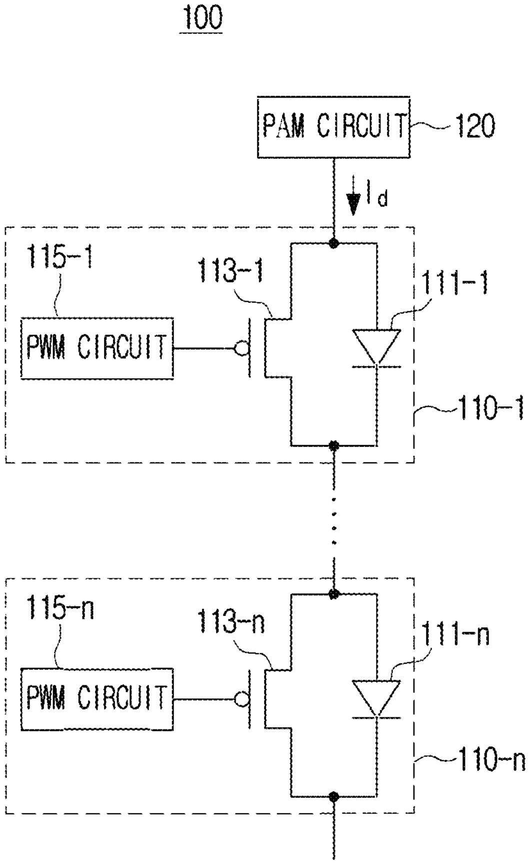
FIG. 5 illustrates a plurality of sub-pixel circuits, according to an embodiment of the disclosure.

FIG. 5 illustrates a plurality of sub-pixel circuits according to an embodiment of the disclosure. Referring to FIG. 5, the inorganic light-emitting diodes 111-1 to **111-*n* included in the plurality of sub-pixel circuits 110-1 to 110-*n*** are connected in series to each other. Here, n represents a predetermined number of two or more.

The plurality of sub-pixel circuits 110-1 to **110-*n* may be connected with one PAM circuit 120. The PAM circuit 120 may be connected in series with one 111-1 of the inorganic light-emitting diodes 111-1 to 111-*n* included in the plurality of sub-pixel circuits 110-1 to 110-*n***.

According to an embodiment of the disclosure, one PAM circuit 120 and a plurality of sub-pixel circuits 110-1 to **110-*n* connected thereto may constitute one unit (or group) 100 in the display module 1000**.

The PAM circuit 120 may provide a driving current $I_d$ of constant amplitude during a light emitting period with the plurality of sub-pixel circuits 110-1 to **110-*n*** connected thereto.

Figure 6:
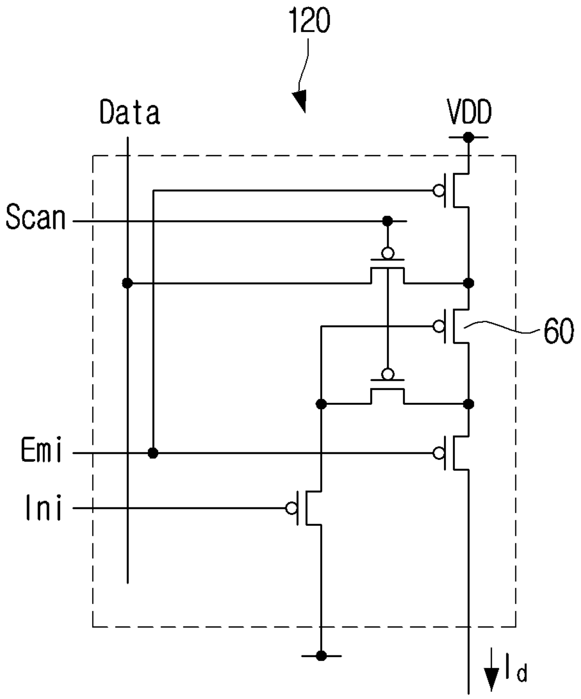
FIG. 6 is a circuit diagram of a PAM circuit, according to an embodiment of the disclosure.

FIG. 6 is a circuit diagram of a PAM circuit according to an embodiment of the disclosure. Referring to FIG. 6, the PAM circuit 120 may provide a driving current $I_d$ of predetermined amplitude to the plurality of connected sub-pixel circuits 110-1 to **110-*n* through the operation of the driving transistor 60** turned on and/or off based on various control signals and data signals applied thereto.

The PAM circuit 120 may set (or program) the PAM data voltage applied through the data line to the gate terminal of the driving transistor 60 during the scan period. When the light emission period starts, the PAM circuit 120 may provide a driving current $I_d$ corresponding to the set PAM data voltage to the plurality of connected sub-pixel circuits 110-1 to **110-*n***.

According to an embodiment of the disclosure, the PAM data voltage may be equally applied to the PAM circuits 120 included in the display module 1000.

According to an embodiment of the disclosure, by applying the same PAM data voltage to the PAM circuits 120 in the display module 1000, the amplitude of the driving current may become the same, thereby solving the problem of the wavelength change of the inorganic light-emitting diode according to the amplitude change of the driving current. In this example, the gradation of each pixel (or each sub-pixel) of the image may be expressed through PWM driving of the inorganic light-emitting diode 111, as described above.

As described above, when the same PAM data voltage is applied to the PAM circuits 120 in the display module 1000, it is possible to set the PAM data voltage at once to reduce the scan time.

However, embodiments are not limited thereto. For example, in order to drive sub-pixel circuits included in a region requiring high dynamic range (HDR) driving, PAM circuits that provide a driving current to the sub-pixel circuits of the corresponding region may be applied with a PAM data voltage of a different value than the remaining PAM circuits.

It should be understood that the PAM circuit 120 is also not limited to the configuration shown in FIG. 6. If the PAM data voltage is set during the scan period and the driving current $I_d$ of the amplitude corresponding to the set PAM data voltage is provided to the plurality of connected sub-pixel circuits 110-1 to **110-*n* during the light-emitting period, a near infinite number of configurations may be used as the PAM circuit 120** in accordance with an embodiment of the disclosure.

The specific operation of the plurality of sub-pixel circuits 110-1 to **110-*n* according to the driving current $I_d$ provided by one PAM circuit 120 is described later with reference to FIG. 8**A.

Hereinbelow, the configuration of the display module 1000 according to various embodiments is described through FIGS. 7A to 7B.

As described above, one PAM circuit 120 and a predetermined number of sub-pixel circuits 110-1 to **110-*n* connected thereto may form one unit group 100 within the display module 1000, and the display module 1000** may include a plurality of unit groups.

For example, when the display module 1000 includes m unit groups, the display module 1000 may include m unit groups from a first group (including a first PAM circuit and a predetermined number of first sub-pixel circuits connected thereto) to an $m^{th}$ group (including a m PAM circuit and a predetermined number of m sub-pixel circuits connected thereto).

In this case, the plurality of inorganic light-emitting diodes 111-1 to **111-*n* included in one unit group 100 may be at least one of a red (R) inorganic light-emitting diode, a green (G) inorganic light-emitting diode, and a blue (B) inorganic light-emitting diode. That is, according to an embodiment of the disclosure, one unit group 100 may constitute the same type of sub-pixels in the display module 1000**.

According to an embodiment of the disclosure, the plurality of sub-pixel circuits 110-1 to **110-*n* included in one unit group 100 may be located in different scan lines adjacent to each other in the display module 1000**.

Figure 7A:
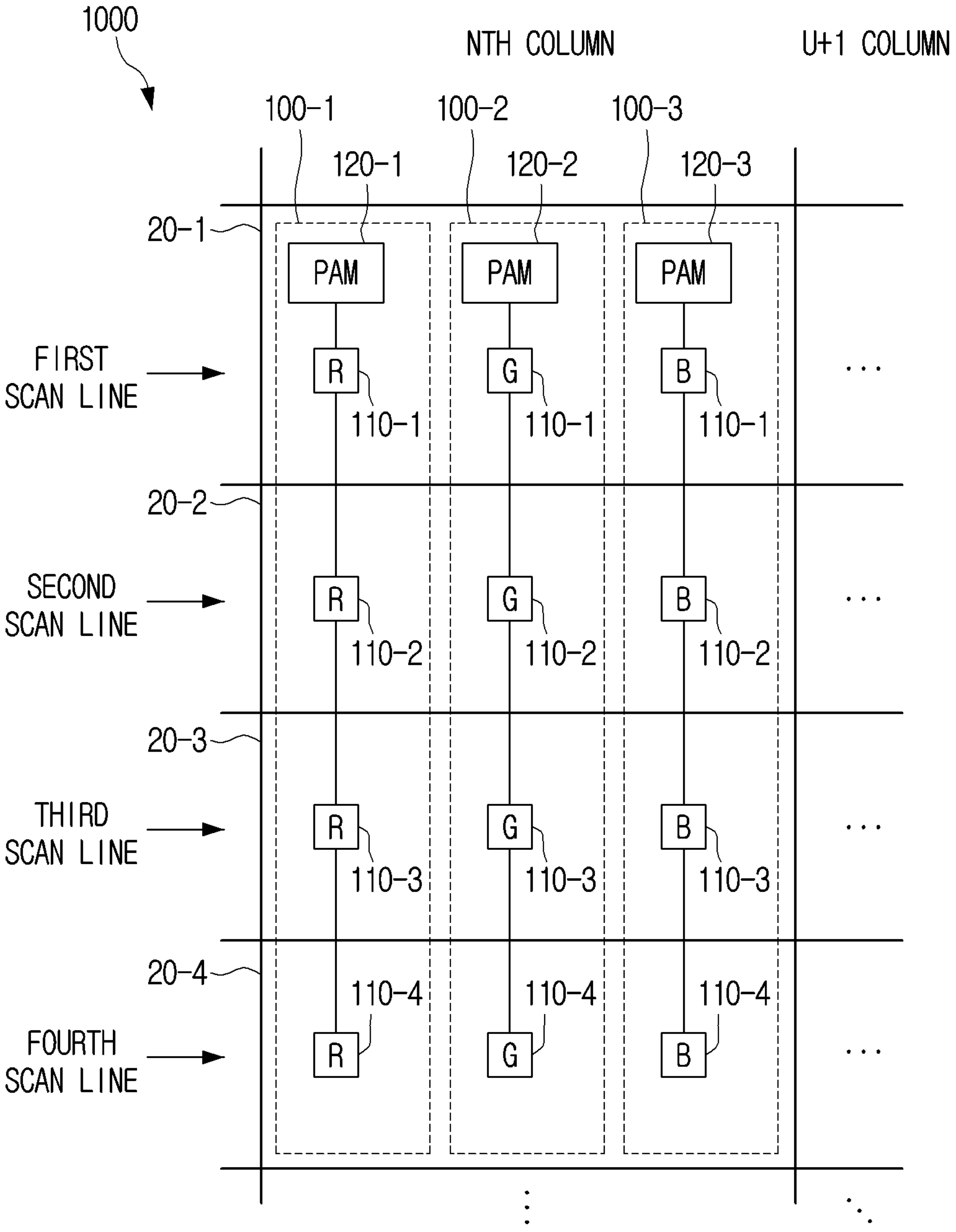
FIG. 7A illustrates a pixel structure of a display module, according to an embodiment of the disclosure.

FIG. 7A illustrates a pixel structure of a display module 1000 according to an embodiment of the disclosure. The R, G, B illustrated in FIG. 7A represents the type of the sub-pixel circuits.

Referring to FIG. 7A, the display module 1000 includes a first unit group 100-1 including a first PAM circuit 120-1 and a first plurality of sub-pixel circuits 110-1 to 110-4, a second unit group 100-2 including a second PAM circuit 120-2 and a second plurality of sub-pixel circuits 110-1 to 110-4, and a third unit group 100-3 including a third PAM circuit 120-3 and a third plurality of sub-pixel circuits 110-1 to 110-4.

One pixel region 20 includes R, G, and B sub-pixel circuits, and one unit group 100-1, 100-2 or 100-3 includes the same kind of sub-pixel circuit, that is, the same type of inorganic light-emitting diode.

The sub-pixel circuits 110-1 to 110-4 included in one unit group 100-1 to 100-3 may be located in adjacent scan lines, respectively.

Referring to FIG. 7A, a plurality of sub-pixel circuits included in one unit group are four, but according to an embodiment, the number of the plurality of sub-pixel circuits included in one unit group may vary and may be set to other values, such as, but not limited to, two, three, five, etc.

Since the plurality of sub-pixel circuits included in one unit group receive the driving current from one PAM circuit, the number of the plurality of sub-pixel circuits included in one unit group may be properly set in consideration of the magnitude of the driving voltage, the IR drop generated in the inorganic light-emitting diode when the driving current flows, or the like.

Referring to FIG. 7A, the same kind of sub-pixel circuit is included in one unit group, but the embodiment is not limited thereto. According to an embodiment, two or three kinds of sub-pixel circuits may be included in one unit group.

However, since there may be differences in characteristics for each type of the inorganic light-emitting diode, that is, for each color of the inorganic light-emitting diode, the same type of inorganic light-emitting diode having the same characteristic may be included in one unit group.

FIG. 7A illustrates a case where each sub-pixel circuit included in one unit group is located at different scan lines adjacent to each other, but the embodiment is not limited thereto According to an embodiment, each of the plurality of sub-pixel circuits included in one unit group may be disposed at any location within the display module 1000.

In FIG. 7A, a first PAM circuit 120-1 is disposed in a pixel region 20-1 in which the sub-pixel circuit 110-1 including the inorganic light-emitting diode 111-1 connected in series with the first PAM circuit 120-1 is located, but the embodiment is not limited thereto.

The first PAM circuit 120-1 may be disposed in any location within the display module 1000 when the first PAM circuit 120-1 is connected in series with one of the inorganic light-emitting diodes 111-1 to 111-4 connected in series to each other in the unit group 100-1. This is the same for the second PAM circuit 120-2 and the third PAM circuit 120-3.

Figure 7B:
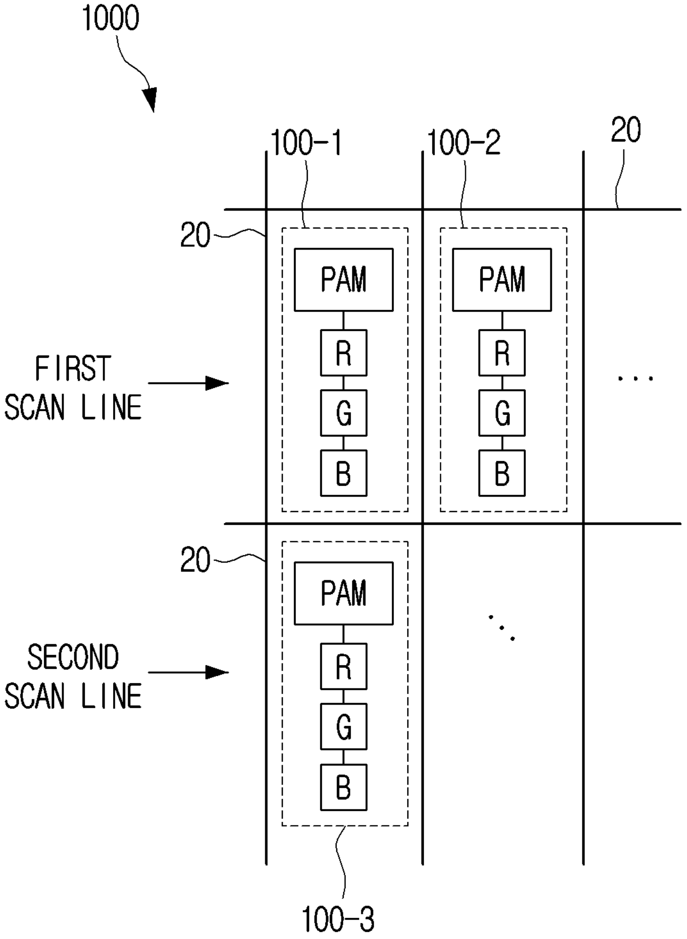
FIG. 7B illustrates a pixel structure of a display module according to another embodiment of the disclosure.

FIG. 7B illustrates a pixel structure of a display module according to another embodiment of the disclosure, and referring to FIG. 7B, each of the unit groups 100-1 to 100-3 included in the display module 1000 includes three different sub-pixel circuits such as R, G, and B.

The R, G, and B sub-pixel circuits included in each unit group are included in one pixel region, rather than adjacent scan lines, and constitute one pixel.

Figure 8A:
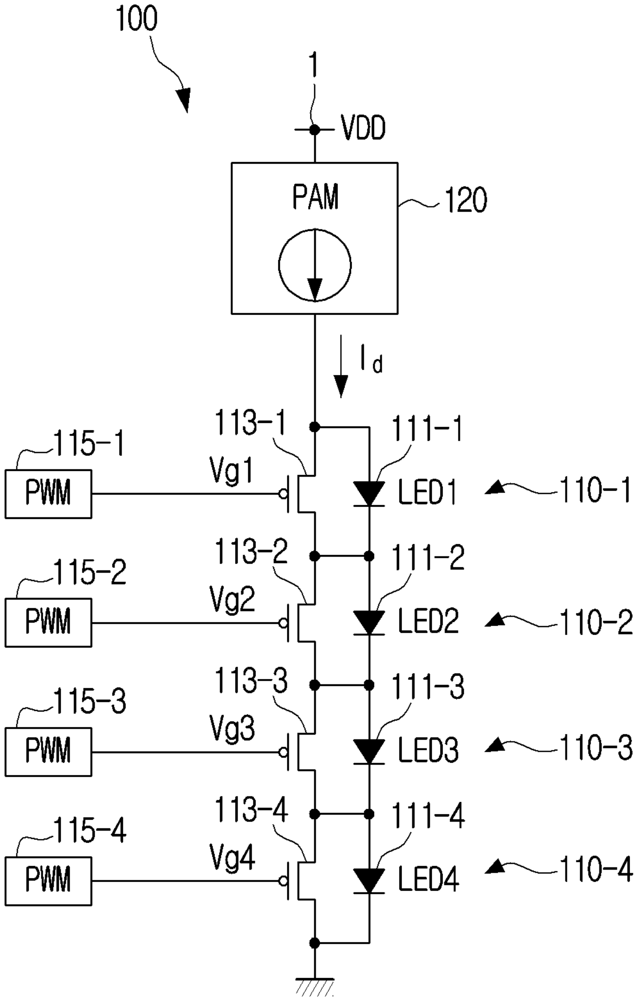
FIG. 8A illustrates a plurality of sub-pixel circuits and PAM circuits, according to an embodiment of the disclosure.
Figure 8B:
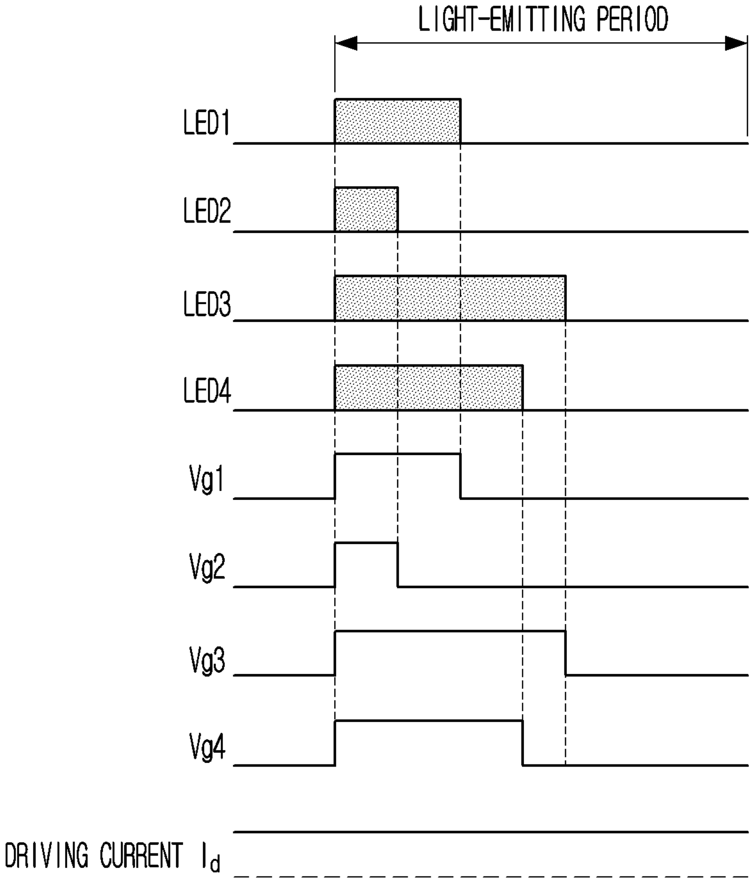
FIG. 8B is a diagram illustrating an example of a method of driving the circuit shown in FIG. 8A.

FIG. 8A illustrates a plurality of sub-pixel circuits and PAM circuits according to an embodiment of the disclosure, and FIG. 8B is a diagram illustrating an example of a method of driving the circuit shown in FIG. 8A.

Referring to FIG. 8A, four sub-pixel circuits 110-1 to 110-4 are included in one unit group 100.

Each of the sub-pixel circuits 110-1 to 110-4 respectively includes inorganic light-emitting diodes 111-1 to 111-4, transistors 113-1 to 113-4 connected in parallel with the inorganic light-emitting diodes 111-1 to 111-4, and PWM circuits 115-1 to 115-4 for controlling the driving time of the driving current $I_d$ provided to the inorganic light-emitting diodes 111-1 to 111-4 by controlling the gate terminal voltage of the transistors 113-1 to 113-4.

The PWM control method is the method to represent gray level by controlling the time during which the $I_d$ flows over the light-emitting diode that is, the driving time of the $I_d$ (or the pulse width of the $I_d$), and the emission time of each of the inorganic light-emitting diodes 111-1 to 111-4 is controlled according to the driving time of the driving current controlled by the PWM circuits 115-1 to 115-4, as described below.

At this time, the inorganic light-emitting diodes 111-1 to 111-4 included in each of the sub-pixel circuits 110-1 to 110-4 are connected in series to each other, and the PAM circuit 120, which provides $I_d$ of a predetermined amplitude to the inorganic light-emitting diodes 111-1 to 111-4, is connected in series with one of the inorganic light-emitting diodes 111-1 to 111-4.

The PAM circuit 120 is connected to a driving voltage terminal 1 for providing a driving voltage VDD for driving the four sub-pixel circuits 110-1 to 110-4, and the last inorganic light-emitting diode 111-4 of the inorganic light-emitting diodes 111-1 to 111-4 serially connected from the PAM circuit 120 is connected to a ground voltage terminal 2.

In the scan period, PWM data voltages are set to the PWM circuits 115-1 to 115-4 included in each of the sub-pixel circuits 110-1 to 110-4, respectively, and the PAM data voltages are set to the PAM circuit 120.

When the emission period starts after the scan period, the PAM circuit 120 starts to provide driving current $I_d$ of an amplitude corresponding to the set PAM data voltage to the inorganic light-emitting diodes 111-1 to 111-4, and the respective inorganic light-emitting diodes 111-1 to 111-4 allow the driving current $I_d$ to flow for a time corresponding to the PWM data voltage set in the PWM driving circuits 115-1 to 115-4. Accordingly, each of the inorganic light-emitting diodes 111-1 to 111-4 emits light for a time corresponding to the set PWM data voltage.

FIG. 8B shows an operation in which each of the inorganic light-emitting diodes 111-1 to 111-4 emits light for a time corresponding to a PWM data voltage according to an output signal of the PWM driving circuits 115-1 to 115-4. In FIG. 8B, Vg1 to Vg4 represent the output signals of each PWM circuit 115-1 to 115-4, and LED1 to LED 4 represent respective inorganic light-emitting diodes 111-1 to 111-4.

Referring to FIGS. 8A and 8B, each PWM circuit 115-1 to 115-4 outputs a high voltage only for a time corresponding to the PWM data voltage. Since each of the transistors 113-1 to 113-4 is turned off only while the output voltage of the PWM driving circuits 115-1 to 115-4 is high, the driving current $I_d$ flows through the respective inorganic light-emitting diodes 111-1 to 111-4 only while the output voltage of the PWM driving circuits 115-1 to 115-4 is high.

Figure 9A:
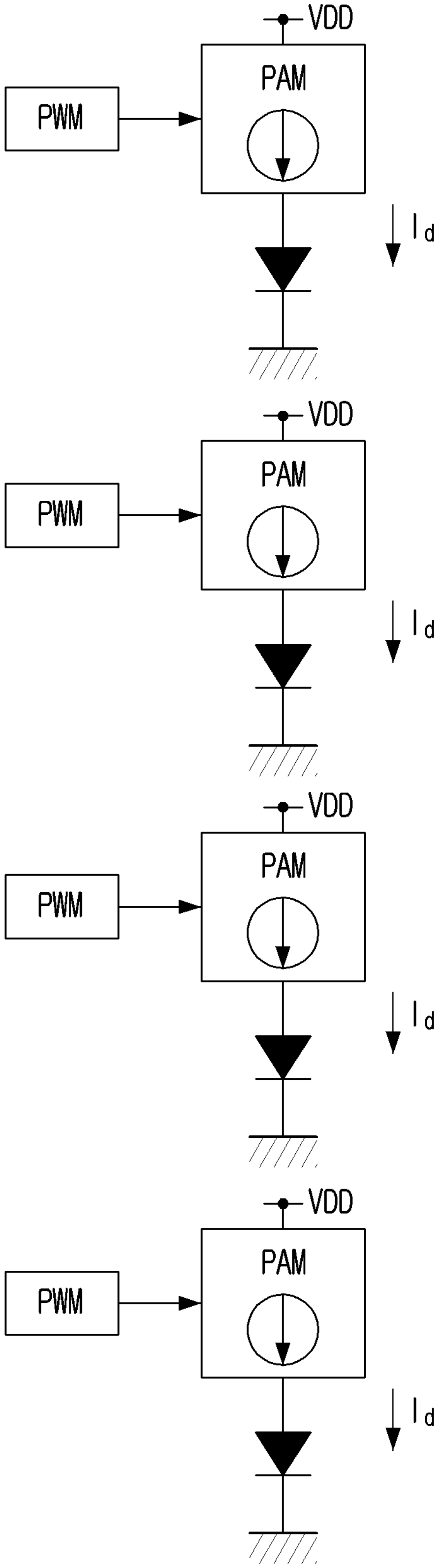
FIG. 9A is a diagram for comparing the power consumption of a display module, according to an embodiment of the disclosure with a related art display module.
Figure 9B:
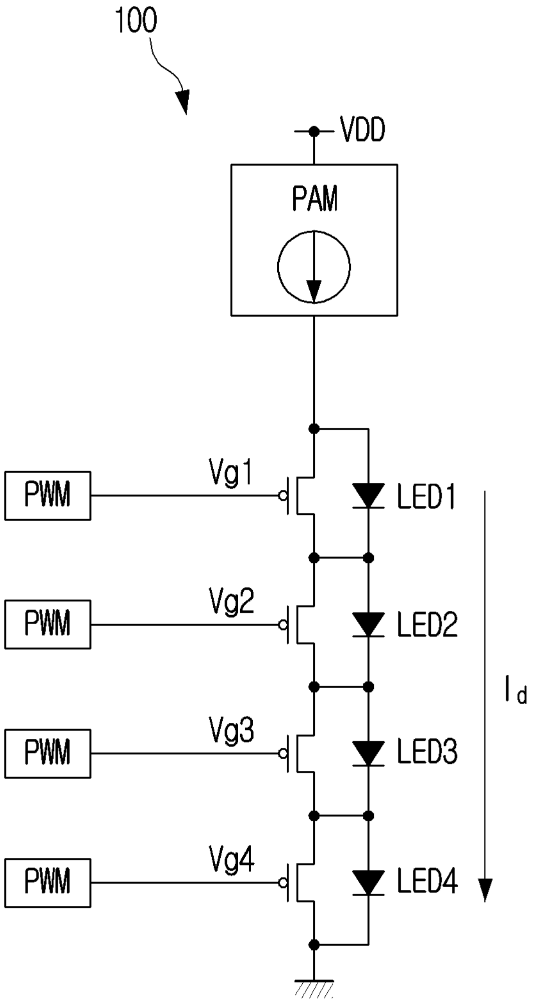
FIG. 9B is a diagram for comparing the power consumption of a display module according to an embodiment of the disclosure with a related art display module.

FIGS. 9A and 9B are diagrams for comparing the power consumption of a display module according to an embodiment of the disclosure with the related display module.

FIG. 9A illustrates four sub-pixel circuits included in a related art display module. It may be seen that the sub-pixel circuit of the related art display module includes both the PAM circuit and the PWM circuit for each inorganic light-emitting diode.

If it is assumed that the driving current $I_d$ flows over four sub-pixels during a predetermined time, the total power consumption P of the four sub-pixel circuits corresponds to the 4*driving voltage VDD*driving current $I_d$.

According to the configuration of the display module 1000 according to an embodiment of the disclosure shown in FIG. 9B, the total power consumption P of the four sub-pixel circuits in the same condition is a value corresponding to the driving voltage VDD*driving current $I_d$.

As described above, according to an embodiment of the disclosure, it is possible to confirm that power consumption may be reduced to ¼ compared to a related art display module configuration.

Figure 10:
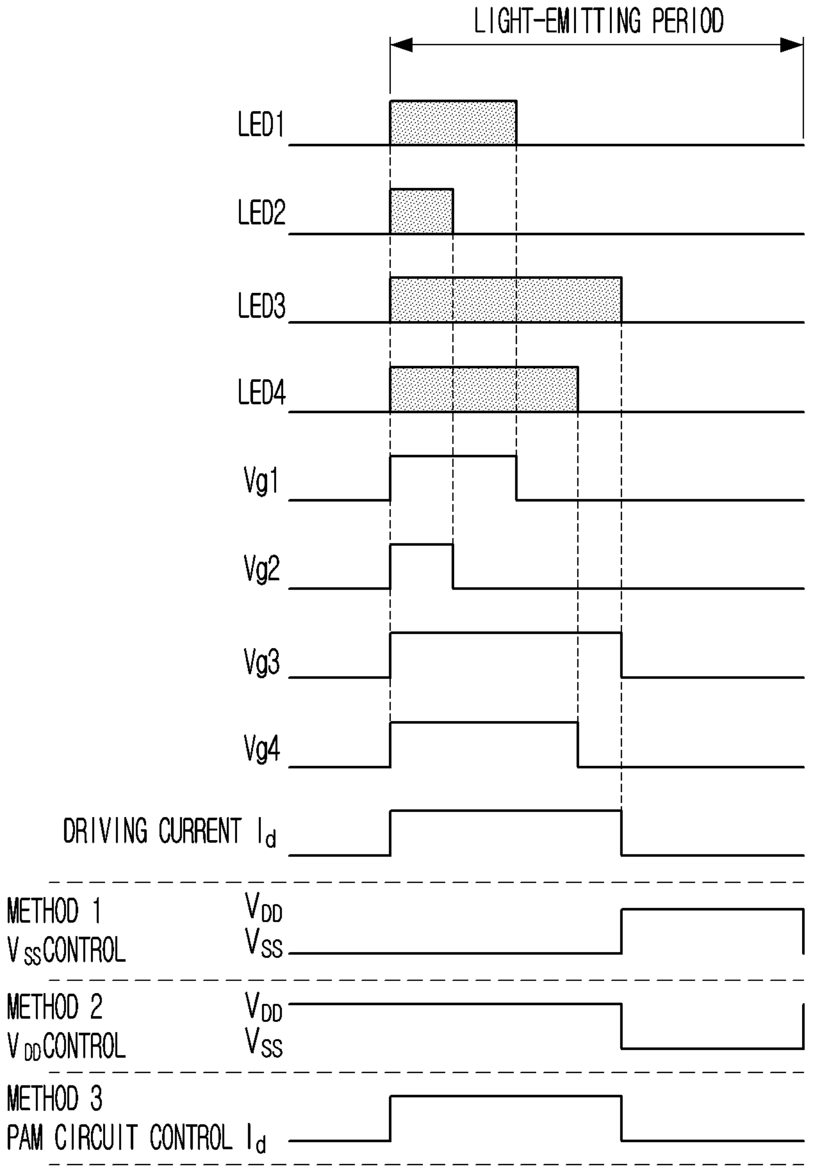
FIG. 10 is a diagram illustrating another example of a method of driving the circuit shown in FIG. 8A.

FIG. 10 is a diagram illustrating another example of a method of driving the circuit shown in FIG. 8A. Referring to FIGS. 8A and 8B, during the light emission period, it may be seen that the driving current $I_d$ continuously flows from the PAM circuit 120 to the ground voltage terminal 2.

In the driving method of FIG. 8B, during the entire period of the light emission period, a driving voltage VDD is applied to the driving voltage terminal 1, a ground voltage VSS is applied to the ground voltage terminal 2, and a driving current $I_d$ flows through the plurality of sub-pixel circuits 110-1 to 110-4.

However, since the inorganic light-emitting diodes 111-1 to 111-4 do not keep emitting light for a light emission period, but emit light only a time period corresponding to the PWM data voltage, so flowing of the driving current $I_d$ even in the time when of the inorganic light-emitting diodes 111-1 to 111-4 do not emit light during the emission period causes unnecessary consumption of power.

That is, since the inorganic light-emitting diodes 111-1 to 111-4 emit light for a period of time corresponding to the set PWM data voltage during the light-emitting period, the light-emitting period according to various embodiments of the disclosure may include an on-period in which the inorganic light-emitting diodes 111-1 to 111-4 emit light and an off-period in which the inorganic light-emitting diodes 111-1 to 111-4 do not emit light. Therefore, the flowing of the driving current $I_d$ even when the inorganic light-emitting diodes 111-1 to 111-4 are in the off-section causes unnecessary power consumption.

Accordingly, the display module 1000 may be driven so that the driving current $I_d$ is not provided to the plurality of sub-pixel circuits 110-1 to 110-4 in the time period in which the inorganic light-emitting diodes 111-1 to 111-4 do not emit light during the light-emitting period, thereby preventing unnecessary power consumption.

FIG. 10 illustrates a method of controlling the voltage of the driving voltage terminal 1 or the voltage of the ground voltage terminal 2 or controlling the operation of the PAM circuit 120 to prevent unnecessary power consumption.

For example, unnecessary power consumption may be prevented by applying the same voltage to the driving voltage terminal 1 and the ground voltage terminal 2 in the time period when the inorganic light-emitting diodes 111-1 to 111-4 do not emit light during the light emission period.

Referring to FIG. 10, since LED 3 111-3 emits light for the longest time, from the time when the light emission of LED 3 111-3 ends to the time at which the light emission period ends, by applying the driving voltage VDD to the ground voltage terminal 2 (Method 1) or applying the ground voltage VSS to the driving voltage terminal 1 (Method 2), the same voltage may be applied to the driving voltage terminal 1 and the ground voltage terminal 2. Accordingly, the driving current $I_d$ no longer flows from the time when the light emission of the LED 3 111-3 ends to the time at which the light emission period ends.

By controlling the operation of the PAM circuit 120 so that the PAM circuit 120 does not provide the driving current $I_d$, from the time when the light emission period of the LED 3 11-3 ends to the light emission period ends, the unnecessary power consumption may be prevented.

As a specific example, a separate PWM circuit may be added to the PAM circuit 120, and a time for which the PAM circuit 120 provides the driving current $I_d$ may be controlled through the added PWM circuit. At this time, the PWM data voltage corresponding to the highest gray level among the PWM data voltages applied to the plurality of sub-pixel circuits 110-1 to 110-4 is set to the separate PWM circuit.

Figure 11A:
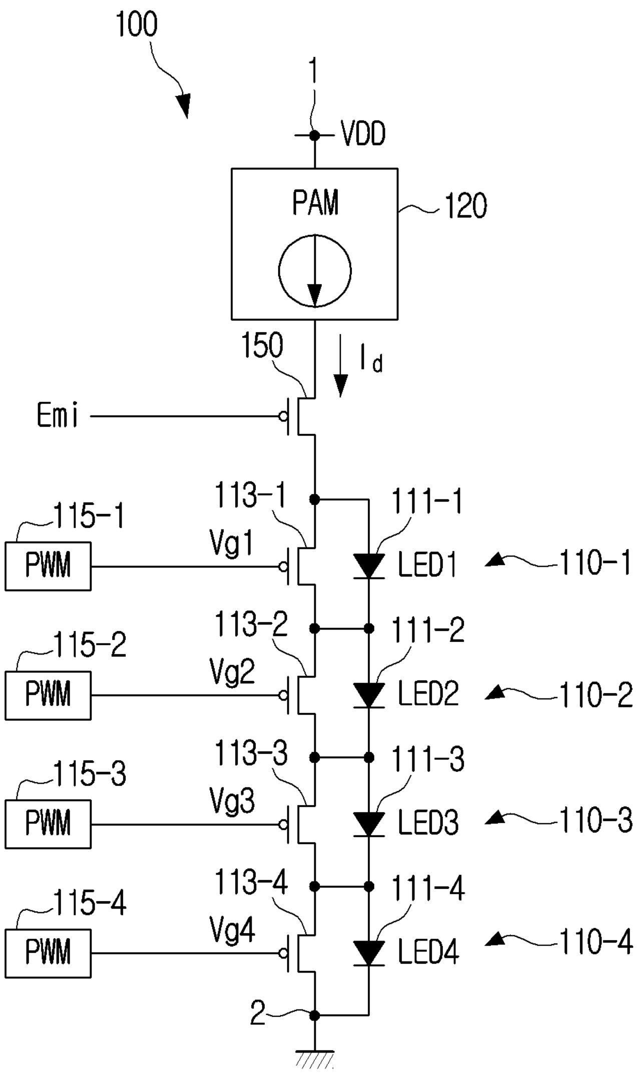
FIG. 11A illustrates a plurality of sub-pixel circuits and PAM circuits, according to another embodiment of the disclosure.
Figure 11B:
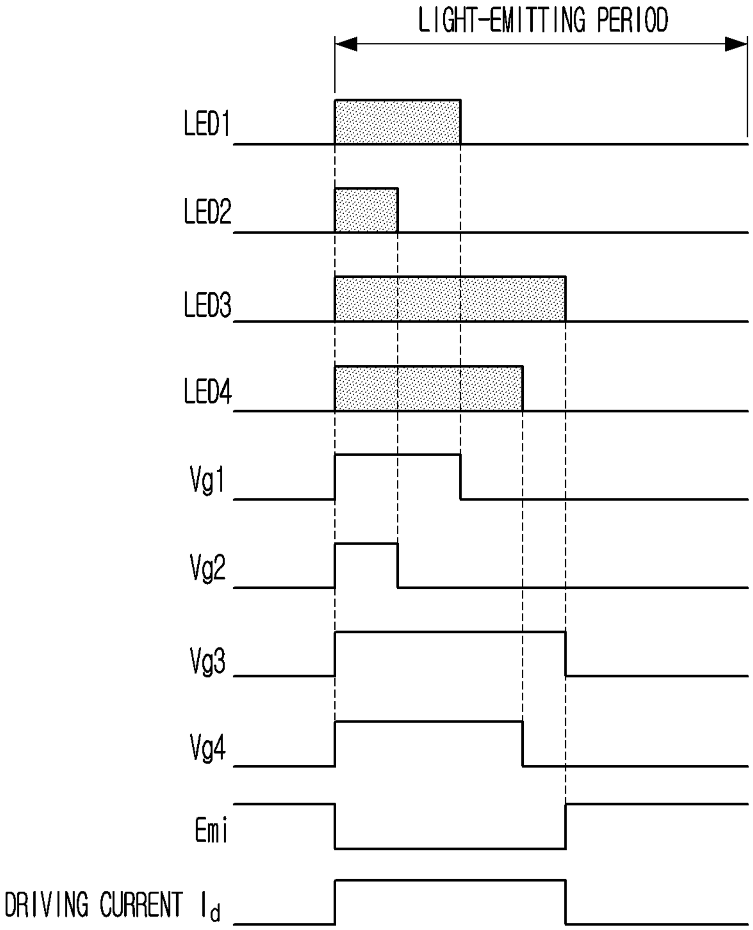
FIG. 11B is a diagram illustrating a method of driving the circuit shown in FIG. 11A.

FIG. 11A illustrates a plurality of sub-pixel circuits and PAM circuits according to another embodiment of the disclosure; FIG. 11B is a diagram illustrating a method of driving the circuit shown in FIG. 11A.

In another method for preventing unnecessary power consumption as described above in FIG. 10, a method of arranging a switching transistor between the driving voltage terminal 1 and the ground voltage terminal 2 may be considered.

Specifically, according to an embodiment of the disclosure, as shown in FIG. 11A, the switching transistor 150 may be disposed between the driving voltage terminal 1 and the inorganic light-emitting diode 111-1. Accordingly, as shown in FIG. 11B, in the time period in which of the inorganic light-emitting diodes 111-1 to 111-4 do not emit light, the switching transistor 150 may be controlled through the control signal Emi so that the switching transistor 150 is turned off, the driving current $I_d$ may not flow to the plurality of sub-pixel circuits 110-1 to 110-4.

The control signal Emi may be provided from external timing controller (TCON), but is not limited thereto.

The position of the switching transistor 150 is not limited to that shown in FIG. 11A. For example, the switching transistor 150 may be disposed between the inorganic light-emitting diode 111-4 and the ground voltage terminal 2.

Figure 12:
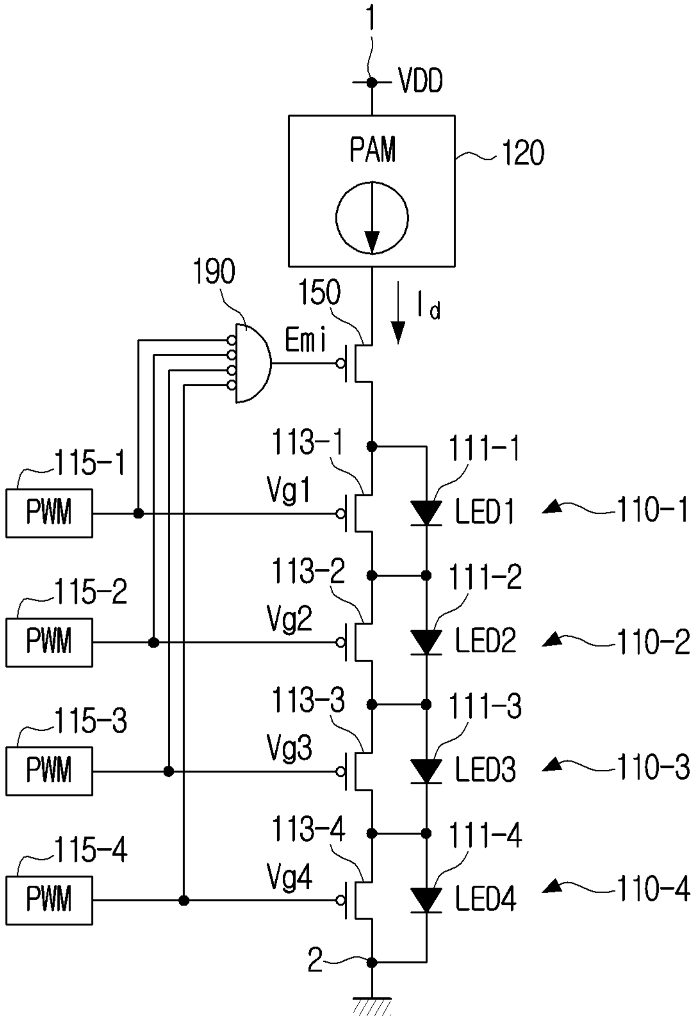
FIG. 12 illustrates a plurality of sub-pixel circuits and PAM circuits, according to another embodiment of the disclosure.

FIG. 12 illustrates a plurality of sub-pixel circuits and PAM circuits according to another embodiment of the disclosure. Referring to FIG. 12, an NOR gate 190 is added, in addition to the circuit of FIG. 11A.

Referring to FIG. 12, the NOR gate 190 has input terminals connected to the output terminals of the PWM circuit 115-1 to 115-4, and an output terminal connected to a gate terminal of the switching transistor 150. That is, the output terminal signal of the NOR gate 190 becomes the aforementioned control signal Emi.

Referring to FIG. 12, the NOR gate 190 outputs a high signal only when the input terminal signals are low. When the output signals of the input PWM circuits 115-1 to 115-4 are low, the input terminal signals of the NOR gate 190 become low.

When the output signals of the PWM circuits 115-1 to 115-4 are low, it is the case where the transistors 113-1 to 113-4 are turned on so that all of the inorganic light-emitting diodes 111-1 to 111-4 do not emit light.

Accordingly, as shown in FIG. 12, by connecting the NOR gate 190, the flow of the driving current $I_d$ flowing to the plurality of sub-pixel circuits 110-1 to 110-4 may be blocked in a time period in which all of the inorganic light-emitting diodes 111-1 to 111-4 do not emit light during the light-emitting period. Accordingly, unnecessary power consumption may be prevented.

Figure 13:
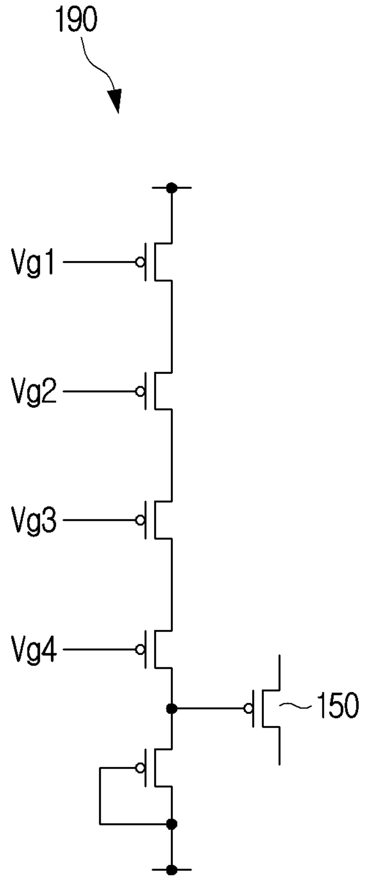
FIG. 13 illustrates a NOR gate circuit, according to an embodiment of the disclosure.

FIG. 13 illustrates an example of a circuit that functions as the NOR gate 190. An example of a circuit that functions as a NOR function is not limited to that shown in FIG. 13.

Figure 14:
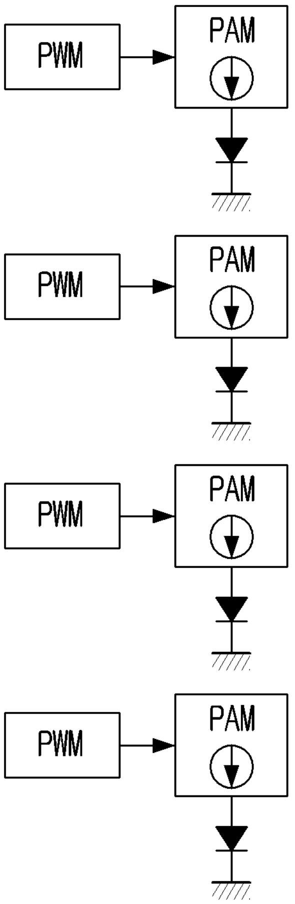
FIG. 14 is a diagram for describing a related display module and a power consumption of a display module, according to an embodiment of the disclosure.
Figure 14:
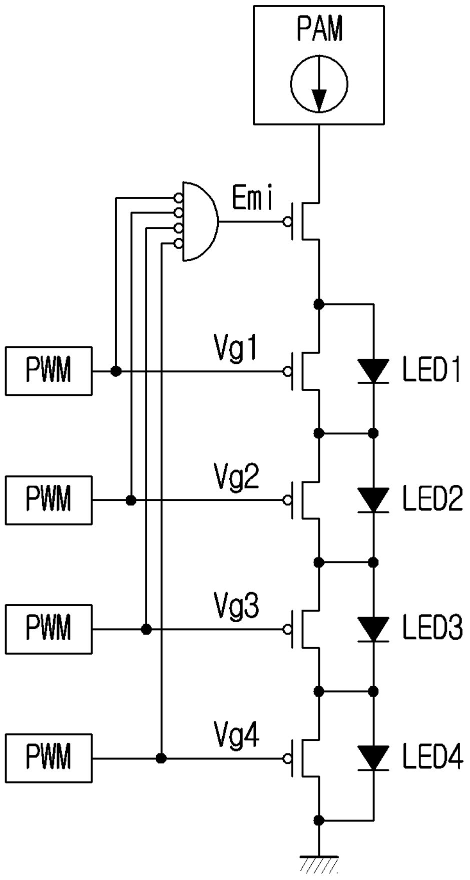

FIG. 14 is a diagram illustrating the power consumption of a display module according to an embodiment of the disclosure including the related display module and the circuit shown in FIG. 12.

Reference numeral 1410 of FIG. 14 illustrates four sub-pixel circuits included in a related display module, and reference numeral 1420 shows a unit group circuit according to an embodiment of the disclosure shown in FIG. 12.

For convenience, reference numerals 1410 and 1420 of FIG. 14 show only four sub-pixel circuits, but the comparison of power was calculated as a total of n sub-pixel circuits.

In detail, in the equation below of reference numerals 1410 and 1420, P is the total power consumed in the n sub-pixel circuits, I is the magnitude of the driving current provided in the PAM circuit, $V_{ds}$ is the voltage drop of the driving transistor included in the PAM circuit, $V_f$ represents the forward voltage drop of the inorganic light-emitting diode, and n represents the number of sub-pixel circuits.

Comparing the two equations of reference numerals 1410 and 1420 shown below, it may be seen that the display module according to an embodiment of the disclosure may have reduced power consumption as much as $(n-1)*I*V_{ds}$ than the related display module.

The power consumption reduction of the display module according to an embodiment of the disclosure may be easily checked even if data related to the power reduction rate shown in reference numeral 1430 is considered.

Figure 15:
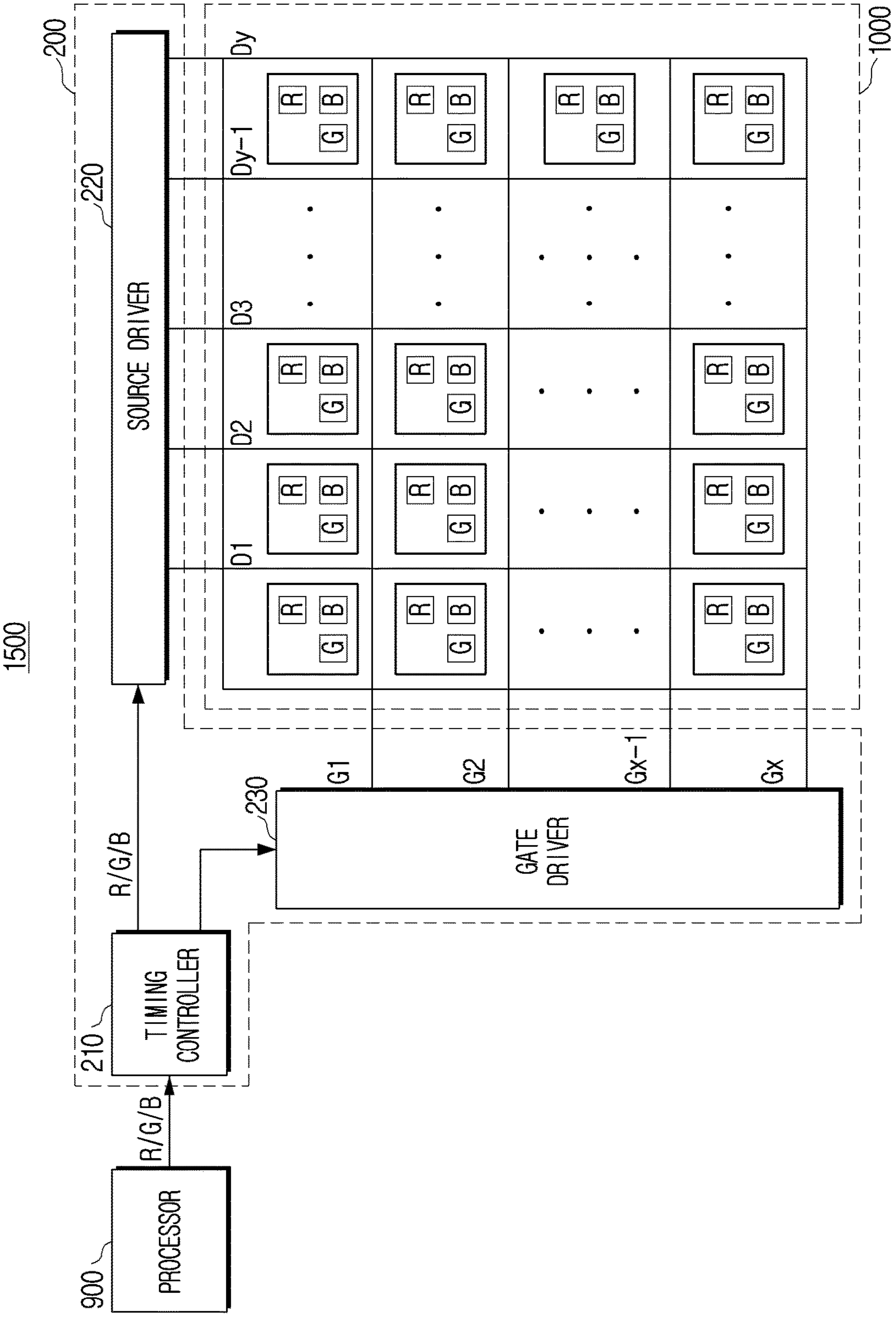
FIG. 15 is a diagram of a display apparatus, according to an embodiment of the disclosure.

FIG. 15 is a block diagram of a display apparatus according to an embodiment of the disclosure. Referring to FIG. 15, the display apparatus 1500 includes a display module 1000, a driver 200, and a processor 900.

The display panel 1000 includes a plurality of pixels, each of which includes a plurality of sub-pixels.

The display panel 1000 may be formed in a matrix shape so that the gate lines (G1 to Gx) and the data lines (D1 to Dy) intersect each other, and each pixel may be formed in a region provided by the intersection.

Each pixel may include three sub-pixels such as R, G, and B, and each sub-pixel included in the display module 1000 may include the sub-pixel circuit 110 including the inorganic light-emitting diode 111 of the corresponding color, the transistor 113 connected in parallel with the inorganic light-emitting diode 111, and the PWM circuit 115.

The sub-pixel circuits included in the display module 1000 may form the group 100 in a predetermined number of units, and the inorganic light-emitting diodes included in the sub-pixel circuits included in the same group are connected in series to each other. For each group, the PAM circuit 120 is connected in series with one of the inorganic light-emitting diodes connected in series with each other.

The data lines (D1 to Dy) are lines for applying a data voltage (especially, a PAM data voltage or PWM data voltage) to each sub-pixel circuit 110 included in the display panel 1000, and the scan lines (G1 to Gx) are lines for selecting sub-pixels included in the display panel 1000 by lines. The data voltage applied through the data lines (D1 to Dy) may be applied to the sub-pixel of the selected scan line through the scan signal.

According to an embodiment, each data line (D1 to Dy) may be applied with the data voltage to be applied to the pixel associated with each data line. As a single pixel includes a plurality of sub-pixels (e.g., R, G, B sub-pixels), the data voltage (that is, R data voltage, G data voltage, and B data voltage) to be applied to each of the R, G, B sub-pixels included in a single pixel may be time-divided and applied to each sub-pixel through one data line.

Data voltages that are time-divided and applied through a single data line as above may be applied to each sub-pixel through the MUX circuit or without the MUX circuit.

The embodiment is not limited thereto. According to an embodiment, unlike FIG. 15, a separate data line may be provided for each R, G, and B sub-pixels. In this example, the data voltages to be applied to each of R, G, and B sub-pixels included in one sub-pixel (that is, R data voltage, the G data voltage, and the B data voltage) need not be time-divided and applied, and a corresponding data voltage may be applied to the corresponding sub-pixel simultaneously through each data line. In this case, the MUX circuit becomes unnecessary. However, data lines which are three times larger than the above example may be required.

Referring to FIG. 15, for convenience of illustration, only one set of scan lines, such as G1 to Gx, are shown. However, the number of the actual scan lines may vary depending on the type and the driving method of the sub-pixel circuit 110 included in the display module 1000.

The driver 200 may drive the display module 1000 according to the control of the processor 900, and may include a timing controller 210, a source driver 220, a scan driver 230, a MUX circuit, a power circuit, or the like.

The timing controller 210 may receive from the outside an input signal (IS), horizontal synchronous signal (Hsync), vertical synchronous signal (Vsync), and main clock signal (MCLK), or the like, generate an image data signal, a scanning control signal, a data control signal, a light emitting control signal, or the like, and provide the same to the display module 1000, the source driver 220, the scan driver 230, power circuit, or the like.

According to one embodiment of the disclosure, the timing controller 210 may provide a control signal Emi for controlling the on/off of the switching transistor 150 of the circuit shown in FIG. 11A to the switching transistor 150, as described above.

The timing controller 210 may generate various control signals Emi, Sweep, Ini, etc., shown in FIGS. 4 and 6, and provide the generated signals to the respective circuits 115 and 120.

The timing controller 210 may be a control signal for selecting the R, G, B sub-pixels, respectively, that is, the MUX signal to the MUX circuit (not illustrated). A plurality of sub-pixels included in the pixels of the display module 1000 may be selected, respectively.

The source driver 220 (or source driver) is a means of generating a data signal, and may generate the data signal (e.g., PWM data voltage signal, PAM data voltage signal) by being forwarded with the image data of the R/G/B component from the processor 900, etc. The source driver 220 may apply the generated data signal to each sub-pixel circuit 110 of the display module 1000 through the data lines (D1 to Dy). The PWM data voltage may be, for example, a voltage between +8V corresponding to black gray level and +15 V corresponding to a white gray level, but is not limited thereto.

The scan driver 230 (or the gate driver) may generate various control signals (e.g., scan signals of FIGS. 4 and 6) for selecting pixels arranged in a matrix form for each scan line (or gate line), and apply the generated control signals to each of the sub-pixel circuits 110 and the PAM circuit 120 of the display module 100 through the scan lines G1-Gx.

According to an embodiment of the disclosure, the scan driver 230 may sequentially apply the generated scan signal to the scan lines connected to the PWM circuits, and sequentially select the entire PWM circuits included in the display module 1000 for each scan line. The scan driver 230 may collectively select the entire PAM circuits included in the display module 1000 by generating a scan signal and collectively applying the scan signal to the scan lines connected to the PAM circuits. However, the embodiment is not limited thereto.

A power circuit may provide a power supply voltage to the pixel circuit 110 included in the display module 1000. In particular, a power circuit may apply a driving voltage VDD and a ground voltage VSS corresponding to the method 1 and 2 shown in FIG. 10 to the driving voltage terminal 1 and the ground voltage terminal 2.

The data driver 220, whole or a part of the configurations included in the driver 200 such as the scan driver 230, the power circuit, the MUX circuit, the clock providing circuit, and the sweep signal providing circuit may be implemented to be included in the TFT layer formed on one surface of the substrate of the display module 1000, or may be implemented as a separate semiconductor IC to be disposed on the other surface of the substrate. When disposed on the other surface of the substrate, the PWM circuit and the PAM circuit formed on the TFT layer may be connected to each other through the internal wiring. In addition, the whole/part of the configuration included in the driver 200 may be implemented as a separate semiconductor IC to be disposed on the main PCB together with the timing controller 210 or the processor 900, but the implementation example is not limited thereto.

A processor 900 controls overall operations of a display apparatus 1300. The processor 900 may drive the display module 1000 by controlling the driver 200.

The processor 900 may be implemented with at least one of a central processing unit (CPU), a micro-controller, an application processor (AP), a communication processor (CP), or an advanced reduced instruction set computing (RISC) machine (ARM) processor.

Referring to FIG. 15, the processor 900 and the timing controller 210 are described as separate components. However, according to an embodiment, only one of the components is included in the display apparatus 1500, and an embodiment in which the included component performs the remaining component function is possible.

Figure 16:
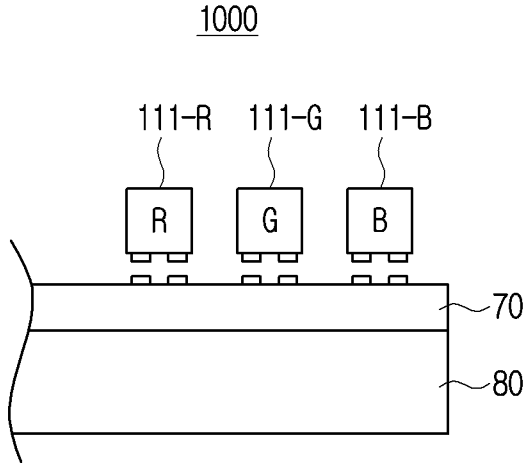
FIG. 16 is a cross-sectional view of a display module, according to an embodiment.

FIG. 16 is a cross-sectional view of a display module according to an embodiment. Referring to FIG. 16, only one pixel included in the display module 1000 is illustrated for convenience.

Referring to FIG. 16, the display module 1000 includes a substrate 80, a TFT layer 70, and an inorganic light-emitting diode R, G, B (111-R, 111-G, and 111-B).

The PWM circuit 115, the transistor 113, the PAM circuit 120, the switching transistor 150, and the NOR gate 190 described above may be implemented as a thin film transistor (TFT), and may be included in the TFT layer 70 formed on the substrate 80.

Each of the inorganic light-emitting diodes R, G, and B (111-R, 111-G, and 111-B) may be mounted on the TFT layer 70 to be electrically connected to the corresponding transistor 113 and the PWM circuit 115, and constitute the sub-pixel circuit 110 described above.

The substrate 80 may be a synthetic resin or a glass or the like, and may be formed of a flexible material or a flexible material, according to an embodiment.

The TFT layer 70 may be an amorphous silicon (a-Si) type, a low temperature polysilicon (LTPS) type, an oxide type, an organic type, or the like.

Referring to FIG. 16, the inorganic light-emitting diode R, G, B (111-R, 111-G, 111-B) is a flip chip type micro LED. However, the inorganic light-emitting diode R, G, B may be a lateral type or a vertical type micro LED according to an embodiment.

Figure 17:
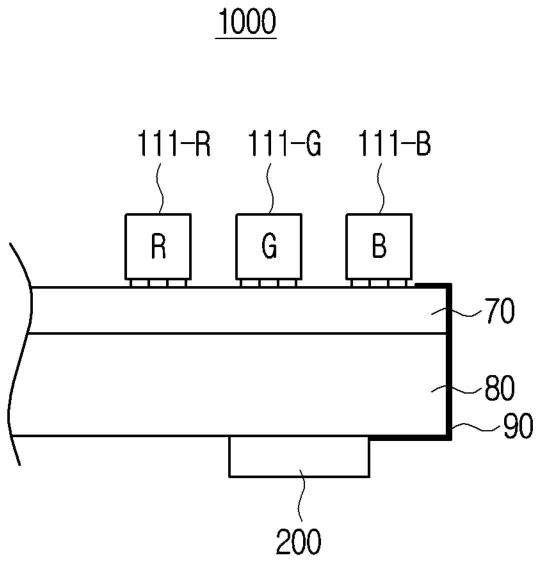
FIG. 17 is a cross-sectional view of a display module, according to another embodiment of the disclosure.

FIG. 17 is a cross-sectional view of a display module according to another embodiment of the disclosure. Referring to FIG. 17, the display module 1000 may include a TFT layer 70 formed on one surface of the glass substrate 80, an inorganic light-emitting diode R, G, B (111-R, 111-G, 111-B) mounted on the TFT layer 70, a driver 200, and a connection wiring 90 electrically connecting the driver 200 and the circuits (e.g., the PWM circuit 115, the transistor 113, the PAM circuit 120, the switching transistor 150, the NOR gate 190) included in the TFT layer 70.

As described above, the driver 200 including the timing controller 210, the source driver 220, the scan driver 230, the MUX circuit, and the power circuit may be implemented on a substrate separate from the display module 1000.

FIG. 17 shows an example in which the driver 200 is disposed on the opposite surface of the glass substrate 80 on which the TFT layer 70 is formed. In this case, the circuits included in the TFT layer 70 may be electrically connected to the driver 200 through a connection wiring 90 formed in an edge region of the TFT panel (hereinafter, TFT panel refers to the TFT layer 70 and the glass substrate 80).

As described above, the reason why the connection wiring 90 is formed in the edge region of the TFT panel 70, 80 to connect the circuits included in the TFT layer 70 and the driver 200 is because a problem such as a crack on the glass substrate 80 may occur due to the temperature difference between the process of manufacturing the TFT panel 70 and 80 and the process of filling the hole with the conductive material.

Figure 18:
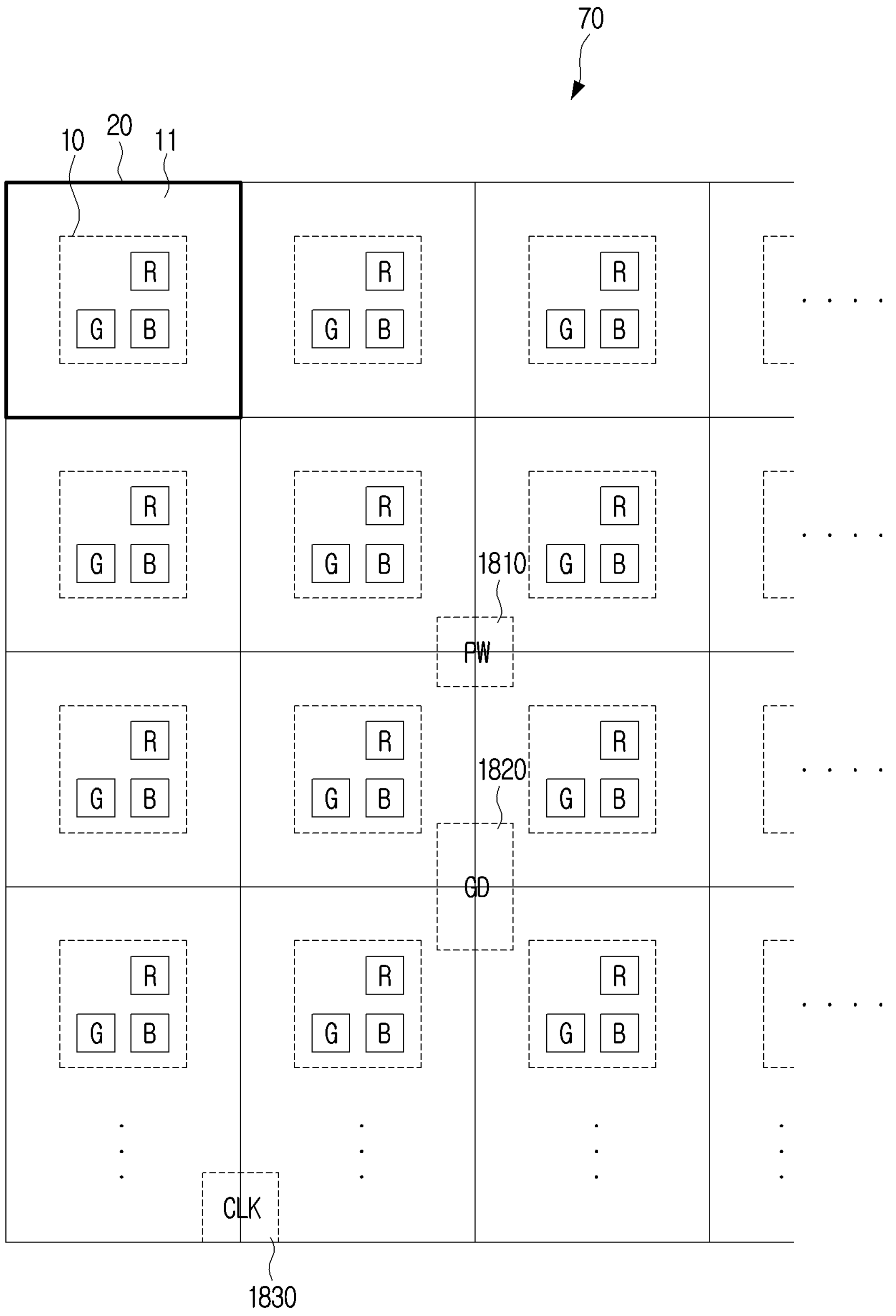
FIG. 18 is a plan view of a thin film transistor (TFT) layer, according to an embodiment.

As described above, a part or whole of the driver 200 may be implemented in the TFT layer 70 of the display module 1000, and FIG. 18 illustrates such an embodiment.

FIG. 18 is a plan view of a TFT layer according to an embodiment of the disclosure. FIG. 18 illustrates the arrangement of various circuits included in the TFT layer 70 of the display module 1000.

Referring to FIG. 18, the pixel region 20 (corresponding to one pixel) of one pixel in the TFT layer 70 may include the region 10 where various circuits (e.g., the PWM circuit 115, the transistor 113, the PAM circuit 120, the switching transistor 150, the NOR gate 190, etc.) for driving R, G, and B sub-pixels are disposed and the remaining region 11 therearound.

According to an embodiment of the disclosure, the size of the region 10 occupied by various circuits for driving R, G, and B sub-pixels may be, for example, a size of one-fourth of the entire pixel region 20, but is not limited thereto.

Since the remaining regions 11 exist in the TFT layer 70, at least one of the various circuits (for example, the timing controller 210, the source driver 220, the scan driver 230, the MUX circuit, the power circuit, the clock providing circuit, and the sweep signal providing circuit) included in the driver 200 may be implemented as a TFT.

FIG. 18 illustrates an example in which the power circuit 1810, the scan driver circuit 1820, and the clock providing circuit 1830 are implemented in the remaining region 11 of the TFT layer 70. In this case, the remaining circuits (for example, the data driver circuit, the kick signal providing circuit, etc.) of the driver 200 for driving the display module 1000 may be disposed on a separate substrate as described above in FIG. 17, and may be connected to circuits included in the TFT layer 70 through the side wiring 90.

However, FIG. 18 is only one example, and a circuit that may be included in the remaining region 11 of the TFT layer 70 is not limited to that shown in FIG. 18. In addition, the position, size, and number of the power circuit 1810, the scan driver circuit 1820, and the clock providing circuit 1830 shown in FIG. 18 are also exemplary, and are not limited thereto.

The TFT layer 70 may further include a multiplexer (MUX) circuit for selecting a plurality of sub-pixels constituting the pixel 10, and an electro-static discharge (ESD) protection circuit for preventing static electricity generated by the display module 1000.

The display module 1000 according to various embodiments of the disclosure may be applied to a wearable device, a portable device, a handheld device, and various electronic products or electronic parts requiring a display, in a single unit. In addition, the plurality of display modules 1000 may be assembled to be applied to a display device, such as a monitor for a personal computer (PC), a high-resolution TV, a signage, an electronic display, or the like.

According to various embodiments, the TFT forming the TFT layer (or the TFT panel) is not limited to a specific structure or type. In other words, the TFT recited in various examples may be implemented as a low temperature poly silicon (LTPS) TFT, an oxide TFT, a poly silicon or a-silicon TFT, an organic TFT, and a graphene TFT, or the like, and may be applied to a P type (or N-type) MOSFET in a Si wafer CMOS process.

As described above, according to various embodiments of the disclosure, the amplitude of the drive current flowing through each LED may be increased without increasing the overall instantaneous current of the display. The luminance of the display may be improved without increasing power consumption. It is possible to drive with lower power for the same luminance.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

The above description is merely illustrative of the technical idea of the disclosure. It will be apparent to those of ordinary skill in the art that various modifications and variations may be made without departing from the essential characteristics of the disclosure. In addition, embodiments according to the disclosure are not intended to limit the technical spirit of the disclosure and are not intended to limit the scope of the disclosure to those skilled in the art. Accordingly, the scope of the disclosure should be construed by the following claims, and all technical concepts within the scope of the disclosure should be construed as being included within the scope of the disclosure.

What is claimed is:

1. A display module comprising:
- a plurality of sub-pixel circuits, each sub-pixel circuit comprising:
  - an inorganic light-emitting diode,
  - a transistor connected in parallel with the inorganic light-emitting diode, wherein source and drain terminals of the transistor are directly connected to anode and cathode terminals of the inorganic light-emitting diode, and
  - a pulse width modulation (PWM) circuit configured to control a light-emitting time of the inorganic light-emitting diode by controlling a voltage of a gate terminal of the transistor based on an applied PWM data voltage that is applied to the PWM circuit; and
- a pulse amplitude modulation (PAM) circuit which is connected in series with the plurality of sub-pixel circuits, the plurality of sub-pixel circuits being connected in series to each other, the PAM circuit being configured to provide a driving current having a constant amplitude to inorganic light-emitting diodes of the plurality of sub-pixel circuits,
- wherein the inorganic light-emitting diodes of the plurality of sub-pixel circuits are connected in series to each other.

2. The display module of claim 1, wherein the plurality of sub-pixel circuits comprises:
- a first plurality of sub-pixel circuits; and
- a second plurality of sub-pixel circuits, and
- wherein the PAM circuit comprises:
  - a first PAM circuit configured to provide the driving current of the constant amplitude to first inorganic light-emitting diodes of the first plurality of sub-pixel circuits; and
  - a second PAM circuit configured to provide the driving current of the constant amplitude to second inorganic light-emitting diodes of the second plurality of sub-pixel circuits.

3. The display module of claim 1, wherein the inorganic light-emitting diodes of the plurality of sub-pixel circuits are any one of a red (R) light-emitting diode, a green (G) light-emitting diode, and a blue (B) light-emitting diode.

4. The display module of claim 1, further comprising a plurality of scan lines configured to select a plurality of pixels disposed in a matrix form line by line, each of the plurality of pixels including red (R), green (G) and blue (B) sub-pixels,
- wherein the plurality of sub-pixel circuits are respectively located in scan lines adjacent to each other.

5. The display module of claim 1, wherein the plurality of sub-pixel circuits are driven in an order of a scan period in which the applied PWM data voltage is set to the PWM circuit and a light emitting period in which the inorganic light-emitting diode emits light during a time corresponding to the set PWM data voltage.

6. The display module of claim 5, wherein the plurality of sub-pixel circuits comprise:
- a first sub-pixel circuit comprising:
  - a first inorganic light-emitting diode,
  - a first transistor connected in parallel with the first inorganic light-emitting diode, and
  - a first PWM circuit configured to control a first light-emitting time of the first inorganic light-emitting diode by controlling a voltage of a first gate terminal of the first transistor based on an applied first PWM data voltage; and
- a second sub-pixel circuit comprising:
  - a second inorganic light-emitting diode,
  - a second transistor connected in parallel with the second inorganic light-emitting diode, and
  - a second PWM circuit configured to control a second light-emitting time of the second inorganic light-emitting diode by controlling a voltage of a second gate terminal of the second transistor based on an applied second PWM data voltage,
- wherein the first PWM data voltage is applied to the first PWM circuit and the second PWM data voltage is applied to the second PWM circuit during the scan period, and wherein, in a light-emitting period, the first inorganic light-emitting diode and the second inorganic light-emitting diode emit light for a first time and a second time corresponding to the first PWM data voltage and the second PWM data voltage, respectively.

7. The display module of claim 5, wherein the PAM circuit is connected to a driving voltage terminal to which a driving voltage for driving the plurality of sub-pixel circuits is provided, wherein a last inorganic light-emitting diode among the inorganic light-emitting diodes which are sequentially connected in series from the PAM circuit is connected to a ground voltage terminal, and wherein, in a light-emitting period, the driving voltage is applied to the driving voltage terminal and a ground voltage is applied to the ground voltage terminal.

8. The display module of claim 5, wherein the PAM circuit is further configured to, in a time period during which the inorganic light-emitting diodes do not emit light during the light emitting period, not provide the driving current to the inorganic light-emitting diodes.

9. The display module of claim 7, wherein, in a time period during which the inorganic light-emitting diodes do not emit light during the light emitting period, a same voltage is applied to the driving voltage terminal and the ground voltage terminal.

10. The display module of claim 7, further comprising:

a switching transistor provided between the driving voltage terminal and the inorganic light-emitting diode connected to the PAM circuit, or between the last inorganic light-emitting diode and the ground voltage terminal, wherein, in a time period in which the inorganic light-emitting diodes do not emit light during the light-emitting period, the switching transistor is turned off.

11. The display module of claim 10, further comprising:

a NOR gate circuit, wherein each input of the NOR gate circuit is connected to an output of each PWM circuit included in the plurality of sub-pixel circuits and an output of the NOR gate circuit is connected to a gate terminal of the switching transistor.

12. The display module of claim 11, wherein each of the transistor connected in parallel with the inorganic light-emitting diode and the switching transistor is a p-channel metal oxide semiconductor field effect transistor (PMOSFET), and wherein, in the time period in which the inorganic light-emitting diodes do not emit light during the light-emitting period, output of the each PWM circuit is low, and output of the NOR gate circuit is high, causing the switching transistor to be turned off.

13. The display module of claim 10, wherein, in the time period in which the inorganic light-emitting diodes do not emit light during the light-emitting period, a control signal to turn off the switching transistor is applied from an external timing controller.

14. A display apparatus comprising:

a display module; and a driving circuit configured to drive the display module, wherein the display module comprises:

a plurality of sub-pixel circuits, each sub-pixel circuit comprising:

an inorganic light-emitting diode, a transistor connected in parallel with the inorganic light-emitting diode, wherein source and drain terminals of the transistor are directly connected to anode and cathode terminals of the inorganic light-emitting diode, and a pulse width modulation (PWM) circuit configured to control a light-emitting time of the inorganic light-emitting diode by controlling a voltage of a gate terminal of the transistor based on an applied PWM data voltage that is applied to the PWM circuit; and a pulse amplitude modulation (PAM) circuit which is connected in series with the plurality of sub-pixel circuits, the plurality of sub-pixel circuits being connected in series to each other, the PAM circuit being configured to provide a driving current of a constant amplitude to inorganic light-emitting diodes of the plurality of sub-pixel circuits, wherein the driving circuit is further configured to apply a corresponding PWM data voltage to PWM circuits of the plurality of sub-pixel circuits, and wherein the inorganic light-emitting diodes are connected in series to each other.

15. The display apparatus of claim 14, wherein the PAM circuit is connected to a driving voltage terminal to which a driving voltage for driving the plurality of sub-pixel circuits is provided, wherein a last light-emitting diode among the inorganic light-emitting diodes sequentially connected in series from the PAM circuit is connected to a ground voltage terminal, and wherein the display module further comprises a switching transistor disposed between the driving voltage terminal and the inorganic light-emitting diode connected to the PAM circuit, or between a last inorganic light-emitting diode and the ground voltage terminal.

* * * * *